United States Patent
Itaya

(10) Patent No.: US 11,217,995 B2
(45) Date of Patent: Jan. 4, 2022

(54) POWER-DISTRIBUTION-SYSTEM MANAGEMENT APPARATUS, POWER-DISTRIBUTION-SYSTEM MANAGEMENT SYSTEM, AND POWER-GENERATION-AMOUNT ESTIMATING METHOD

(71) Applicant: Mitsubishi Electric Corporation, Tokyo (JP)

(72) Inventor: Nobuhiko Itaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 298 days.

(21) Appl. No.: 15/761,243

(22) PCT Filed: Nov. 26, 2015

(86) PCT No.: PCT/JP2015/083227
§ 371 (c)(1),
(2) Date: Mar. 19, 2018

(87) PCT Pub. No.: WO2017/090152
PCT Pub. Date: Jun. 1, 2017

(65) Prior Publication Data
US 2018/0262011 A1    Sep. 13, 2018

(51) Int. Cl.
*H02J 3/00* (2006.01)
*G05B 13/02* (2006.01)
*H02J 13/00* (2006.01)

(52) U.S. Cl.
CPC .............. *H02J 3/00* (2013.01); *G05B 13/021* (2013.01); *H02J 3/003* (2020.01);
(Continued)

(58) Field of Classification Search
CPC .......... H02J 3/383; H02J 3/00; H02J 13/0006; H02J 3/003; H02J 13/00034; H02J 3/381;
(Continued)

(56) References Cited

U.S. PATENT DOCUMENTS

2010/0204844 A1* 8/2010 Rettger ..................... H02J 3/06
700/291
2010/0293045 A1* 11/2010 Burns ................ G06Q 30/0208
705/14.11
(Continued)

FOREIGN PATENT DOCUMENTS

JP     2011-078168 A     4/2011
JP     2011-222980 A     11/2011
(Continued)

OTHER PUBLICATIONS

Office Action (Notification of Reasons for Refusal) dated Jun. 12, 2018, by the Japanese Patent Office in corresponding Japanese Patent Application No. 2017-552611 and English translation of the Office Action (5 pages).
(Continued)

*Primary Examiner* — Kenneth M Lo
*Assistant Examiner* — Mohammed Shafayet
(74) *Attorney, Agent, or Firm* — Buchanan Ingersoll & Rooney PC

(57) ABSTRACT

A power-distribution-system management apparatus according to the present invention includes a communication unit that acquires an amount of insolation, which is a measurement value measured by a pyranometer, via a communication network, which is used to collect a measurement value of a smart meter that measures electric energy, and a meter-data management apparatus and a power-generation-amount estimating unit that estimates, on the basis of the amount of insolation, a power generation amount of each of
(Continued)

two or more solar power generation facilities connected to a power distribution line of a high voltage system.

13 Claims, 13 Drawing Sheets

(52) U.S. Cl.
CPC ..... *H02J 13/00002* (2020.01); *H02J 2300/24* (2020.01); *Y02E 10/56* (2013.01); *Y02E 40/70* (2013.01); *Y04S 10/123* (2013.01)

(58) Field of Classification Search
CPC ............. H02J 2300/24; H02J 13/00002; H02J 13/00022; G05B 13/021; Y04S 10/123; Y04S 10/50; Y04S 40/126; Y04S 10/30; Y02E 10/563; Y02E 40/72; Y02E 10/56; Y02E 40/70; Y02E 60/00
USPC ......................................................... 700/287
See application file for complete search history.

(56) References Cited

U.S. PATENT DOCUMENTS

| | | | | |
|---|---|---|---|---|
| 2011/0137591 A1* | 6/2011 | Ishibashi | ................ | G06Q 50/06 |
| | | | | 702/60 |
| 2012/0103395 A1* | 5/2012 | Prengler | ................ | G06Q 50/06 |
| | | | | 136/248 |
| 2012/0143383 A1* | 6/2012 | Cooperrider | ............ | H02J 3/383 |
| | | | | 700/295 |
| 2012/0181974 A1* | 7/2012 | Kuniyosi | ................ | H02J 3/383 |
| | | | | 320/101 |
| 2013/0054037 A1* | 2/2013 | Ikawa | ....................... | G05F 1/67 |
| | | | | 700/286 |
| 2013/0152998 A1* | 6/2013 | Herzig | .................. | H04L 41/026 |
| | | | | 136/246 |
| 2013/0274938 A1* | 10/2013 | Ahn | .................... | H04L 12/2803 |
| | | | | 700/291 |
| 2014/0257584 A1 | 9/2014 | Tanimoto et al. | | |
| 2014/0278332 A1* | 9/2014 | Grammatikakis | ...... | G06F 30/20 |
| | | | | 703/18 |
| 2015/0073737 A1 | 3/2015 | Inuzuka | | |
| 2015/0160040 A1* | 6/2015 | Furukawa | ........... | H02J 13/0086 |
| | | | | 340/870.09 |
| 2015/0269664 A1* | 9/2015 | Davidson | ............... | G06Q 40/00 |
| | | | | 705/35 |
| 2015/0326017 A1* | 11/2015 | Sasaki | ....................... | H02J 3/46 |
| | | | | 307/24 |
| 2015/0326018 A1* | 11/2015 | Hidaka | .................... | H02J 3/383 |
| | | | | 307/24 |
| 2016/0019323 A1 | 1/2016 | Tsuruta et al. | | |
| 2017/0307665 A1* | 10/2017 | Shinozaki | ................. | H02J 7/35 |

FOREIGN PATENT DOCUMENTS

| | | |
|---|---|---|
| JP | 2012-44740 A | 3/2012 |
| JP | 2012-147578 A | 8/2012 |
| JP | 2013-106502 A | 5/2013 |
| JP | 2013-162666 A | 8/2013 |
| JP | 2014179464 A | 9/2014 |

OTHER PUBLICATIONS

*International Search Report (PCT/ISA/210) dated Feb. 16, 2016, by the Japanese Patent Office as the International Searching Authority for International Application No. PCT/JP2015/083227.
Office Action dated Feb. 10, 2020, issued in corresponding Indian Patent Application No. 201847016772, 7 pages.

* cited by examiner

FIG.7

| SM NUMBER |
|---|
| USED AMOUNT OF POWER |
| POWER GENERATION AMOUNT |

FIG.8

| SM NUMBER |
|---|
| AMOUNT OF INSOLATION |

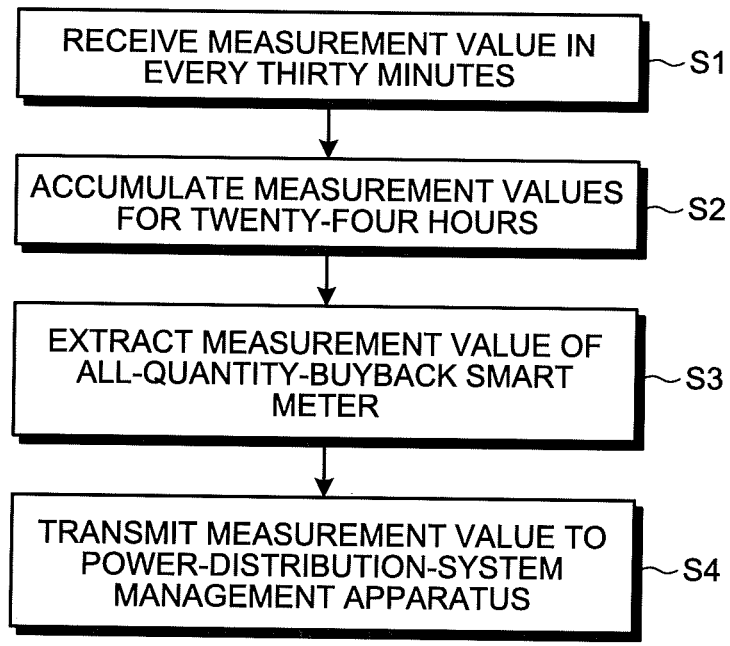

| SM NUMBER | CUSTOMER NUMBER | PV CONTRACT TYPE | SM TYPE | ... |
|---|---|---|---|---|
| M1 | 1 | ALL-QUANTITY BUYBACK | UPLINK MEASUREMENT | |
| M2 | 1 | ALL-QUANTITY BUYBACK | DOWNLINK MEASUREMENT | |
| M3 | 2 | SURPLUS BUYBACK | UPLINK AND DOWNLINK MEASUREMENT | |
| ⋮ | ⋮ | ⋮ | ⋮ | |

FIG.13

| SM NUMBER | LATITUDE, LONGITUDE | PV PANEL CAPACITY | ... |
|---|---|---|---|
| M1 | X1, Y1 | P1 | |
| M2 | X2, Y2 | P2 | |
| M3 | X3, Y3 | P3 | |
| ⋮ | ⋮ | ⋮ | |

FIG.14

| SM NUMBER | LATITUDE, LONGITUDE | ... |
|---|---|---|
| M10 | A1, A2 | |
| ⋮ | ⋮ | |

POWER-DISTRIBUTION-SYSTEM MANAGEMENT APPARATUS, POWER-DISTRIBUTION-SYSTEM MANAGEMENT SYSTEM, AND POWER-GENERATION-AMOUNT ESTIMATING METHOD

FIELD

The present invention relates to a power-distribution-system management apparatus, a power-distribution-system management system, and a power-generation-amount estimating method, which comprise calculating a power generation amount in a power distribution system.

BACKGROUND

In general, a power distribution system is composed of a high voltage system and a low voltage system, and a power reception end of a general consumer is connected to the low voltage system. The high voltage system is usually for 6600 volts, but the low voltage system is, in general, for 100 volts to 200 volts. Note that, in the following explanation, the power distribution system refers to a high voltage system unless specifically noted otherwise.

For facility planning of a power distribution system, it is desirable to grasp a load amount of the power distribution system as accurately as possible. In recent years, in a smart community being researched in recent years, it is desirable to grasp a load amount and a power generation amount of a power distribution system for operation plannings of power supply apparatuses and energy storage apparatuses set dispersedly in the community and a power purchase planning from a power company or the like.

On the other hand, in general, sensors for grasping a voltage, an electric current, and the like are set near a feeding point of a power distribution line. Therefore, if the power generation amount in the power distribution system is known, it is possible to grasp the load amount using measurement values of the sensors and the power generation amount.

Recently, various large and small solar power generation systems including a solar power generation system for home use and a mega solar facility are connected to a power distribution system. A power generation amount by the solar power generation system fluctuates according to an amount of insolation. In Patent Literature 1 mentioned below, there is described a load estimation apparatus that measures, with a pyranometer, an amount of insolation in a solar power generation system.

CITATION LIST

Patent Literature

Patent Literature 1: Japanese Patent Application Laid-Open No. 2013-162666

SUMMARY

Technical Problem

However, when the power generation amount is obtained by measuring the amount of insolation as explained above, there has been a problem in that a communication line needs to be provided between the load estimation apparatus and the pyranometer and cost therefor increases. Further, it has been necessary to dispose pyranometers near all consumer's houses, which are to be estimation targets of the load amount, to calculate the power generation amount, thereby leading to a problem of increasing cost therefor.

The present invention has been devised in view of the above circumstances, and an object of the present invention is to obtain a power-distribution-system management apparatus that can grasp a power generation amount in a power distribution system while suppressing an increase in cost.

Solution to Problem

To solve the above-mentioned problems and achieve the object, a power-distribution-system management apparatus according to the present invention has an acquiring unit to acquire an amount of insolation, which is a measurement value measured by a pyranometer, via a smart meter network, which is a network used to collect a measurement value of a smart meter that measures an amount of electric power. The power-distribution-system management apparatus further has a power-generation-amount estimating unit to estimate, on the basis of the amount of insolation, a power generation amount of each of two or more solar power generation facilities connected to a power distribution line of a high voltage system.

Advantageous Effects of Invention

The power-distribution-system management apparatus according to the present invention has an advantageous effect that it is possible to acquire a power generation amount in a power distribution system while suppressing an increase in cost.

BRIEF DESCRIPTION OF DRAWINGS

FIG. 7 is a diagram illustrating an example of measurement data transmitted by the smart meter in the first embodiment.

FIG. 8 is a diagram illustrating an example of measurement data transmitted by a measurement apparatus in the first embodiment.

FIG. 9 is a flowchart illustrating an example of a processing procedure of a measurement value of the smart meter in the meter-data management apparatus.

FIG. 10 is a chart illustrating an example of SM number data in the first embodiment.

FIG. 13 is a chart illustrating a configuration example of solar power generation facility data in the first embodiment.

FIG. 14 is a chart illustrating a configuration example of pyranometer position data in the first embodiment.

DESCRIPTION OF EMBODIMENTS

A power-distribution-system management apparatus, a power-distribution-system management system, a measurement apparatus, and a power-distribution-system managing method according to embodiments of the present invention are described in detail below with reference to the drawings. Note that the present invention is not limited by the embodiments.

First Embodiment

Figure 1:
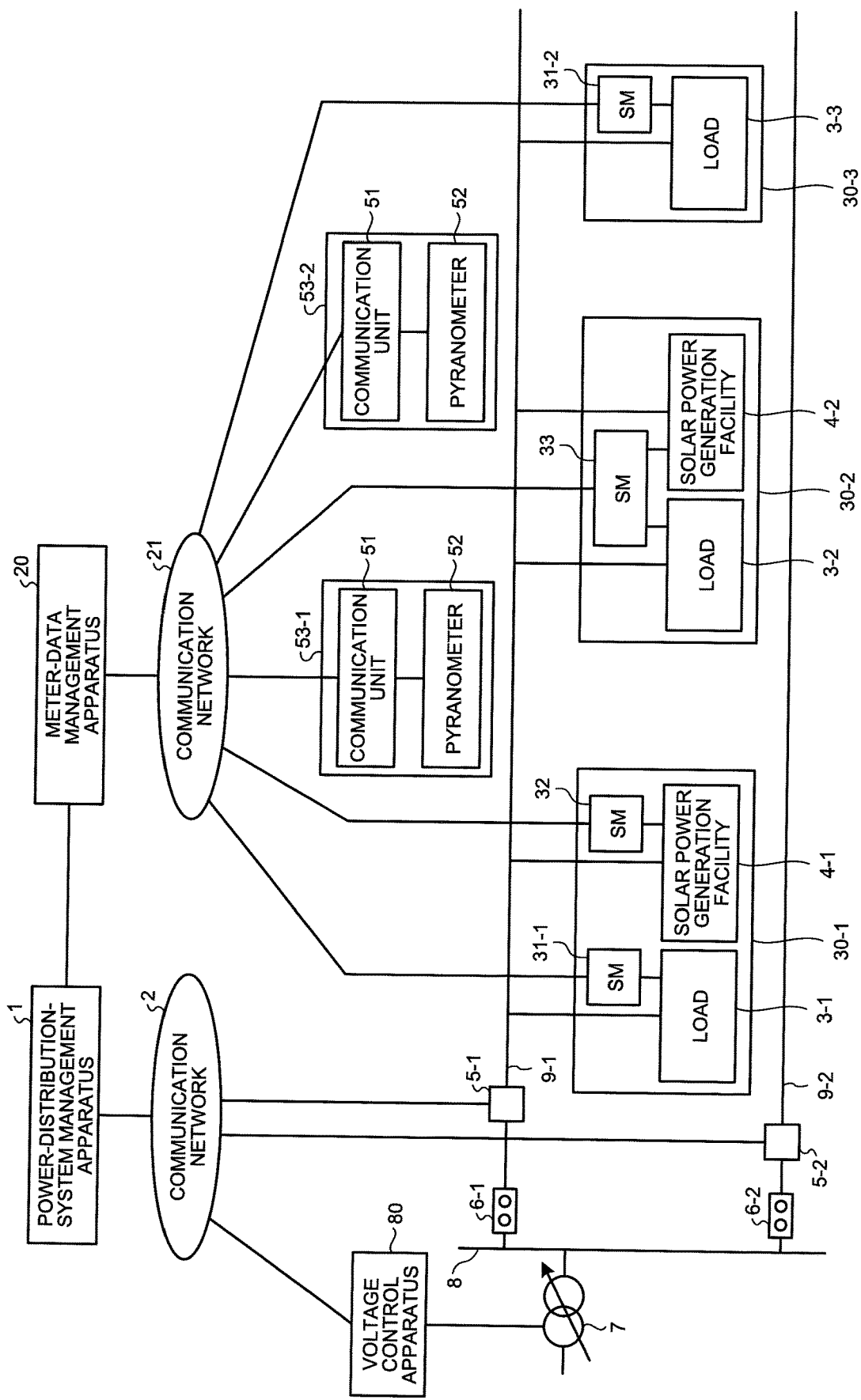
FIG. 1 is a diagram illustrating an example of a power-distribution-system management system in a first embodiment.

FIG. 1 is a diagram illustrating an example of a power-distribution-system management system in a first embodiment according to the present invention. In FIG. 1, a voltage control device 7 is a load ratio control transformer (LRT: a transformer with on-load tap changer) functioning as a transformer for power distribution set in, for example, an electric power substation. A bus 8 is connected to a secondary side of the voltage control device 7. Two power distribution lines 9-1 and 9-2 are connected in parallel to the bus 8. The power distribution lines 9-1 and 9-2 are power distribution lines for a high voltage system. Note that, in FIG. 1, an example is illustrated in which the two power distribution lines are connected. However, the number of power distribution lines connected to the bus 8 is not limited to two.

One end of the power distribution line 9-1 is connected to the bus 8 via a breaker 6-1. In the power distribution line 9-1, a high voltage sensor 5-1, which is a measurement apparatus that measures a voltage and a tidal current for feeding of the power distribution line 9-1, is set at an end point on an upstream side. One end of the power distribution line 9-2 is connected to the bus 8 via a breaker 6-2. In the power distribution line 9-2, a high voltage sensor 5-2, which is a measurement apparatus that measures a voltage and a tidal current for feeding of the power distribution line 9-2, is set at an end point on the upstream side. The breaker 6-1 and the high voltage sensor 5-1 may be configured integrally. The breaker 6-2 and the high voltage sensor 5-2 may be configured integrally.

The high voltage sensors 5-1 and 5-2 measure the voltages and the tidal currents, for example, with a constant, and transmit averages for a constant time of measured results as measurement information. Although any values can be used as the period for measurement and the constant time in calculating the averages in the high voltage sensors 5-1 and 5-2, the period for measurement is set to one second and the constant time in calculating the averages is set to one minute, for example. The high voltage sensors 5-1 and 5-2 each have a communication function and are connected to a communication network 2. The high voltage sensors 5-1 and 5-2 periodically transmit the measurement information to a power-distribution-system management apparatus 1 via the communication network 2. Note that the high voltage sensors 5-1 and 5-2 may be configured to transmit the measurement information when receiving an instruction to request transmission of the measurement information from the power-distribution-system management apparatus 1 rather than to periodically transmit the measurement information.

Loads 3-1 to 3-3 and solar power generation facilities 4-1 and 4-2 are connected to the power distribution line 9-1. The loads 3-1, 3-2, and 3-3 respectively mean loads in consumer units. The load 3-1 is a load of a consumer 30-1, the load 3-2 is a load of a consumer 30-2, and the load 3-3 is a load of a consumer 30-3. Note that, in FIG. 1, a part of all loads and solar power generation facilities connected to the power distribution line 9-1 is illustrated. Loads and solar power generation facilities other than those illustrated in FIG. 1 are also connected to the power distribution line 9-1. In FIG. 1, for simplification of the figure, loads and solar power generation facilities connected to the power distribution line 9-2 are omitted. However, loads and solar power generation facilities are connected to the power distribution line 9-2 as well.

As illustrated in FIG. 1, the consumer 30-1 has the solar power generation facility 4-1 and the consumer 30-2 has the solar power generation facility 4-2. The consumer 30-3 does not have a solar power generation facility. The consumer 30-1 has, with an electric utility, an all-quantity buyback contract for selling a full amount of power generation obtained by the solar power generation facility 4-1. That is, the solar power generation facility 4-1 is a power generation facility that is a subject of the all-quantity buyback contract. The consumer 30-2 has, with the electric utility, a surplus buyback contract for selling a surplus obtained by subtracting an amount for the load 3-2 from a power generation amount obtained by the solar power generation facility 4-2.

Smart meters 31-1, 31-2, 32, and 33 are power meters for automatic meter reading and each have a communication function. Note that, in the figure, a smart meter is abbreviated as SM. The smart meter 32, which measures a power generation amount of the solar power generation facility 4-1, is connected to the solar power generation facility 4-1 of the consumer 30-1 having the all-quantity buyback contract. The smart meter 31-1 is connected to the load 3-1 of the solar power generation facility 4-1. The smart meter 33 is connected to the load 3-2 and the solar power generation facility 4-2 of the consumer 30-2 having the surplus buyback contract. The smart meter 31-2 is connected to the load 3-3 of the consumer 30-3. The smart meters 31-1 and 31-2 measure an amount of electric power in a downlink direction, that is, a direction from an electric utility to a consumer. The smart meter 32 measures an amount of electric power in an uplink direction, that is, a direction from the consumer to the electric utility. The smart meter 33 measures an amount of electric power obtained by subtracting the electric power amount in the downlink direction from the electric power amount in the uplink direction. Note that, when the smart meters 31-1 and 31-2 are explained without being distinguished from each other, the smart meters 31-1 and 31-2 are described as smart meter 31 or smart meters 31 as well.

The smart meters 31-1, 31-2, 32, and 33 are connected to a meter-data management apparatus 20 via a communication network 21. The smart meters 31-1, 31-2, 32, and 33 each measure an amount of electric power in a constant measurement period and transmit the measured electric power amount to the meter-data management apparatus 20. That is, the communication network 21 is a communication network for transmitting and receiving measurement data obtained by the measurement of the smart meters. In this embodiment, the measurement period of the smart meters 31-1, 31-2, 32, and 33 is set to thirty minutes. Note that the measurement period of the smart meters 31-1, 31-2, 32, and 33 is not limited to thirty minutes.

The power-distribution-system management apparatus 1 estimates a load amount in the power distribution system using a measurement value of a smart meter that measures a power generation amount of a solar power generation facility of a consumer having an all-quantity buyback contract, that is, a solar power generation facility that is a subject of the all-quantity buyback contract. In the following explanation, the smart meter that measures a power generation amount of the solar power generation facility of the consumer having the all-quantity buyback contract is abbreviated as all-quantity buyback smart meter. The smart meter 32 illustrated in FIG. 1 is the all-quantity buyback smart meter. The power-distribution-system management apparatus 1 can be set in a business office, a control office, or the like responsible for a power distribution system that is a target of management.

The voltage control device 7 is connected to a voltage control apparatus 80 that controls the voltage control device 7. The power-distribution-system management apparatus 1 transmits, for example, information indicating upper and lower limits of a voltage control range as a voltage control amount to the voltage control apparatus 80 through the communication network 2. The voltage control apparatus 80 controls the voltage control device 7 on the basis of the information received from the power-distribution-system management apparatus 1. Two or more voltage control devices, not illustrated, are connected to the power distribution lines 9-1 and 9-2, and these voltage control devices are respectively controlled by voltage control apparatuses. As with the voltage control apparatus 80, at least some of the voltage control apparatuses may perform control on the basis of the voltage control amount received from the power-distribution-system management apparatus 1 through the communication network 2. In this way, this embodiment is described on a premise of a concentrated voltage control scheme in which the power-distribution-system management apparatus 1 performs the voltage control of the power distribution system. Note that an example is described in which the power-distribution-system management apparatus 1 has a function of a concentrated voltage control apparatus that performs concentrated control of voltage, but a concentrated voltage control apparatus itself may be provided separately from the power-distribution-system management apparatus 1.

A measurement apparatus 53-1 and a measurement apparatus 53-2, which measure an amount of insolation, are connected to the communication network 21. In the following explanation, when the measurement apparatuses 53-1 and 53-2 are explained without being distinguished from each other, the measurement apparatuses 53-1 and 53-2 are described as measurement apparatus(es) 53. In FIG. 1, two measurement apparatuses are illustrated. However, actually, a number of measurement apparatuses 53 only have to be disposed to be geographically distributed. For example, one measurement apparatus is set in an approximately 1-kilometer square. The measurement apparatus 53 is desirably set in a place where the measurement apparatus 53 is shaded for only a short time period. The measurement apparatus 53 is set in, for example, the north side of a road, a rooftop of a building, a roof of a house, an electric pole, or a relay tower of a mobile communication system such as a cellular phone network. A place for setting the measurement apparatus 53 is not limited to these places.

The measurement apparatus 53 includes a communication unit 51 that performs communication processing for connection to the communication network 21 and a pyranometer 52 that measures an amount of insolation. The communication unit 51 transmits a measurement value, that is, measurement data obtained by the measurement of the pyranometer 52 to the communication network 21. The communication unit 51 can be formed in common with communication units in the smart meters 31-2, 31-2, 32, and 33 explained below.

Figure 2:
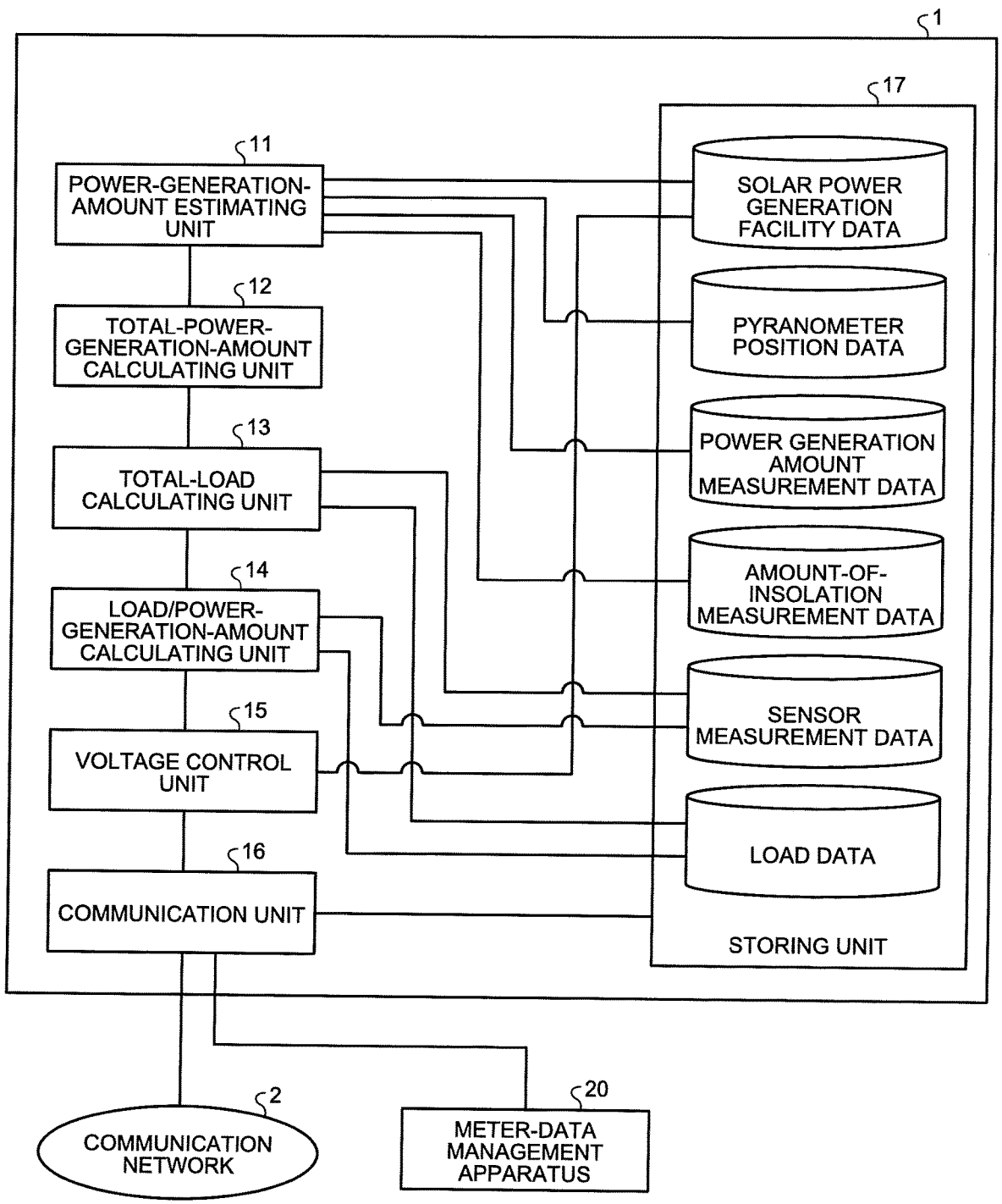
FIG. 2 is a diagram illustrating a configuration example of a power-distribution-system management apparatus in the first embodiment.

FIG. 2 is a diagram illustrating a configuration example of the power-distribution-system management apparatus 1 in this embodiment. The power-distribution-system management apparatus 1 includes a power-generation-amount estimating unit 11, a total-power-generation-amount calculating unit 12, a total-load calculating unit 13, a load/power-generation-amount calculating unit 14, a voltage control unit 15, a communication unit 16, and a storing unit 17.

The power-generation-amount estimating unit 11 estimates a power generation amount in the past for each of the solar power generation facilities in a power distribution system using a measurement value obtained by the all-quantity buyback smart meter and a measurement value obtained by the pyranometer, that is, the measurement apparatus 53 in the past. The total-power-generation-amount calculating unit 12 estimates a total power generation amount in the past in power distribution line units on the basis of the power generation amount in the past for each of the solar power generation facilities. Note that, as explained below, this example is based on the premise that the power-distribution-system management apparatus 1 acquires a measurement value of the all-quantity buyback smart meter and a measurement value of the measurement apparatus 53 for each day via the communication network 21 and the meter-data management apparatus 20. Therefore, the power-distribution-system management apparatus 1 is based on the premise that the measurement value of the all-quantity buyback smart meter and the measurement value of the measurement apparatus 53 are measurement values in the past, that is, day-old values. Nevertheless, the power-distribution-system management apparatus 1 may be configured to be capable of acquiring the measurement value by the all-quantity buyback smart meter and the measurement value by the measurement apparatus 53 substantially on a real-time basis. In this case, the power generation amount of each of the solar power generation facilities estimated by the power-generation-amount estimating unit 11 and the total power generation amount calculated by the total-power-generation-amount calculating unit 12 are not day-old amounts but are amounts acquired substantially on a real-time basis.

The total-load calculating unit 13 calculates a total load amount in the past on the basis of measurement values of the high voltage sensors 5-1 and 5-2 in the past and power generation amounts in the past and stores the total load amount in the storing unit 17 as load data. At this time, the load data may be stored in association with at least one of temperature, time, and a day of the week. When the load data is stored in association with at least one of the temperature, the time, and the day of the week in this way, it is possible to estimate a load amount corresponding to the temperature, the time, the day of the week, or the like when a load amount at present or in future is estimated using load data in the past.

The communication unit 16 receives measurement values of the high voltage sensors 5-1 and 5-2 via the communication network 2. The communication unit 16 transmits information indicating the voltage control amount calculated by the voltage control unit 15 to the voltage control apparatus 80 or the voltage control apparatus 80 and other one or more voltage control apparatuses. The communication unit 16 stores the received measurement values of the high voltage sensors 5-1 and 5-2 in the storing unit 17 as sensor measurement data. The communication unit 16 performs communication with the meter-data management apparatus 20. The communication unit 16 stores amount-of-insolation measurement data and power generation amount measurement data received from the meter-data management apparatus 20 in the storing section 17.

Figure 3:
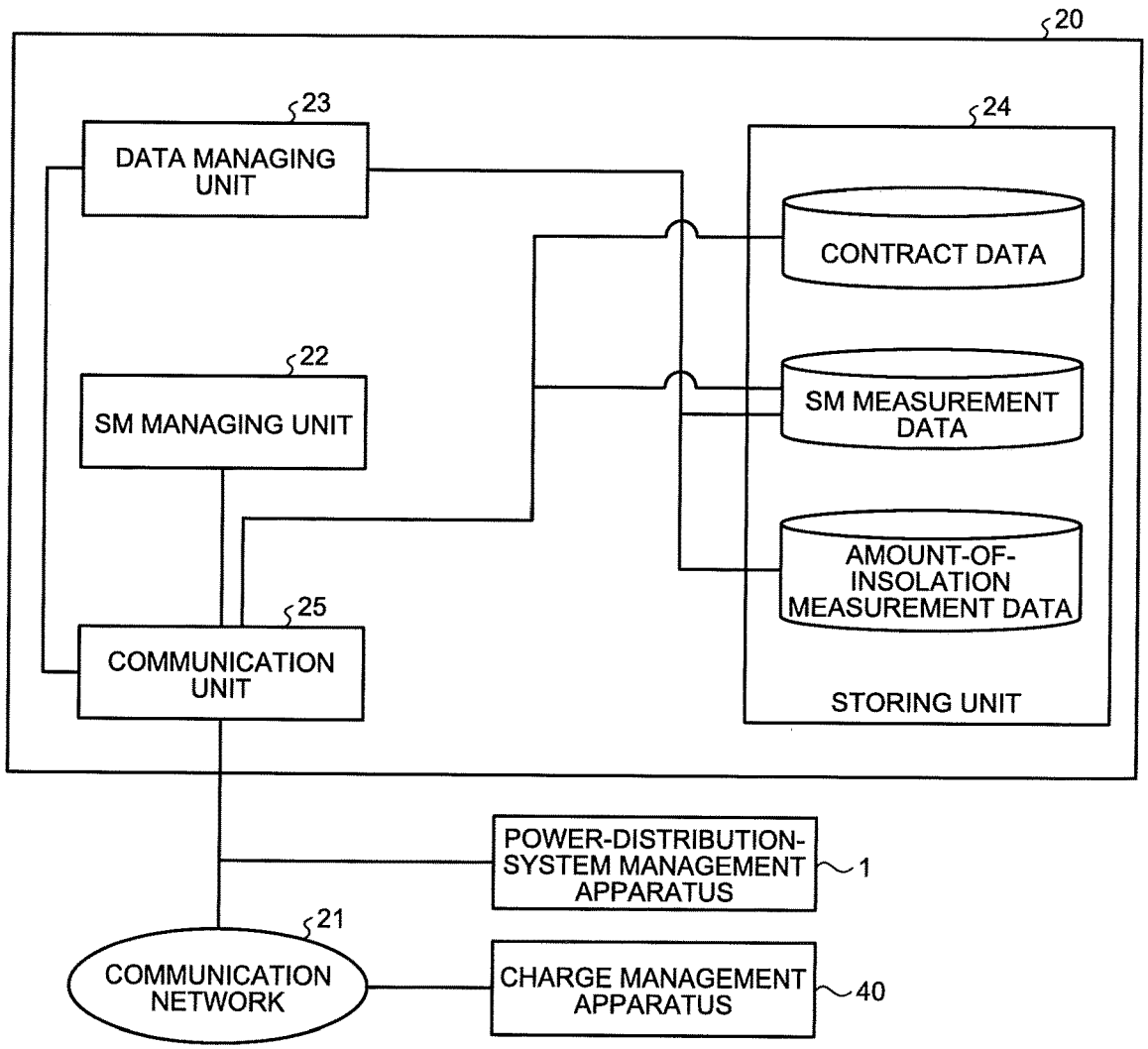
FIG. 3 is a diagram illustrating a configuration example of a meter-data management apparatus in the first embodiment.

FIG. 3 is a diagram illustrating a configuration example of the meter-data management apparatus 20. The meter-data management apparatus 20 includes an SM managing unit 22, a data managing unit 23, a storing unit 24, and a communication unit 25. The communication unit 25 performs communication with the smart meters and the measurement apparatus 53 via the communication network 21. The communication unit 25 performs communication with the power-generation-amount estimating unit 11 and a charge management apparatus 40. The charge management apparatus 40 is a device that performs processing for sale and purchase of electric power including preparation of bills indicating electric charges to be charged to consumers by the electric utility and preparation of notices of purchase amounts of electricity purchased from the consumers by the electric utility.

The meter-data management apparatus 20 is a management device called meter data management system (MDMS), which receives measurement data, which is measurement values of electric power amount, that is, automatic meter reading data from the smart meters 31-1, 31-2, 32, and 33 and stores SM measurement data, which is the received measurement data, in the storing unit 24. Further, the meter-data management apparatus 20 stores amount-of-insolation measurement data, which is the measurement data received from the measurement apparatus 53, that is, the measurement data obtained by the measurement of the pyranometer 52, in the storing unit 24. The meter-data management apparatus 20 controls a start, a stop, and the like of the smart meters 31-1, 31-2, 32, and 33. The meter-data management apparatus 20 may be configured to control a start, a stop, and the like of the measurement apparatus 53.

The SM managing unit 22 performs at least control of a start and a stop of the smart meters. The SM managing unit 22 may be configured to control a start, a stop, and the like of the measurement apparatus 53. The data managing unit 23 performs management of SM management data received from the smart meters. The data management unit 23 transmits the SM measurement data, which is the measurement data of the smart meters, stored in the storing unit 24 to the charge management apparatus 40 and the power-distribution-system management apparatus 1 via the communication unit 25. The data managing unit 23 transmits the power generation amount measurement data, which is the measurement data of the all-quantity buyback smart meter, of the SM data measurement data stored in the storing unit 24 and the amount-of-insolation measurement data, which is the measurement data of the measurement apparatus 53, stored in the storing unit 24 to the power-distribution-system management apparatus 1 via the communication unit 25.

Figure 4:
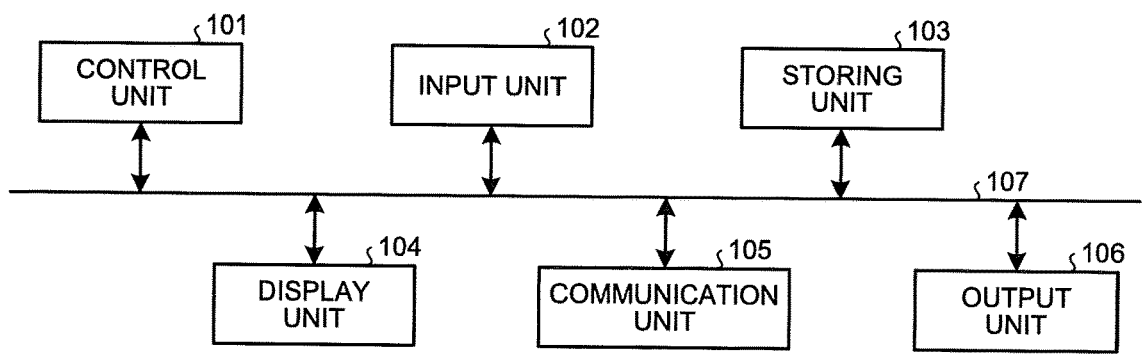
FIG. 4 is a diagram illustrating a configuration example of a computer system in the first embodiment.

The power-distribution-system management apparatus 1 is specifically a computing machinery system, that is, a computer. A power-distribution-system management program is executed on this computing machinery system, whereby the computer system functions as the power-distribution-system management apparatus 1. FIG. 4 is a diagram illustrating a configuration example of the computing machinery system in this embodiment. As illustrated in FIG. 4, the computing machinery system includes a control unit 101, an input unit 102, a storing unit 103, a display unit 104, a communication unit 105, and an output unit 106, these unit being connected with each other via a system bus 107.

In FIG. 4, the control unit 101 is, for example, a central processing unit (CPU) or the like, and executes the power-distribution-system management program in this embodiment. The input unit 102 is configured by, for example, a keyboard and/or a mouse. A user of the computing machinery system uses the input unit 102 to perform inputting of various kinds of information. The storing unit 103 includes various memories such as a random access memory (RAM) and a read only memory (ROM) and a storage device such as a hard disk, and stores programs to be executed by the control unit 101, necessary data obtained in a process of processing, and the like. The storing unit 103 is used as a temporary storage region of programs as well. The display unit 104 is configured by a liquid crystal display panel (LCD) or the like and displays various screens to the user of the computing machinery system. The communication unit 105 carries out communication processing. Note that FIG. 4 is an example, and the configuration of the computing machinery system is not limited to the example of FIG. 4.

An operation example of the computing machinery system until the power-distribution-system management program in this embodiment amounts to an executable state is explained. In the computing machinery system having the configuration explained above, the power-distribution-system management program is installed in the storing unit 103 from, for example, a CD-ROM or a DVD-ROM set in a not-illustrated compact disc (CD)-ROM or digital versatile disc (DVD)-ROM drive. At the time of execution of the power-distribution-system management program, the power-distribution-system management program read out from the storing unit 103 is stored in a predetermined place of the storing unit 103. In this state, the control unit 101 executes power-distribution-system management processing in this embodiment according to a program stored in the storing unit 103.

Note that, in this embodiment, the program describing the power-distribution-system management processing is provided using the CD-ROM or the DVD-ROM as a recording medium. However, not only this concept, but, for example, a program provided by a transmission medium such as the Internet through the communication unit 105 may also be used for adapting to the configuration of the computing machinery system, a capacity of a program to be provided, or the like.

The power-generation-amount estimating unit 11, the total-power-generation-amount calculating unit 12, the total-load calculating unit 13, the load/power-generation-amount calculating unit 14, and the voltage control unit 15 illustrated in FIG. 2 is included in the control unit 101 illustrated in FIG. 4. The storing unit 17 illustrated in FIG. 2 is a part of the storing unit 103 illustrated in FIG. 4. The communication unit 16 illustrated in FIG. 2 corresponds to the communication unit 105 illustrated in FIG. 4.

As with the power-distribution-system management apparatus 1, the meter-data management apparatus 20 is specifically a computing machinery system. When the meter-data management apparatus 20 is mounted on the computing machinery system illustrated in FIG. 4, the SM managing unit 22 and the data managing unit 23 illustrated in FIG. 3 are included in the control unit 101 illustrated in FIG. 4. The storing unit 24 illustrated in FIG. 3 is a part of the storing unit 103 illustrated in FIG. 4. The communication unit 25 illustrated in FIG. 3 corresponds to the communication unit 105 illustrated in FIG. 4. An operation example of the computing machinery system until a meter-data management program, which is a program for realizing the meter-data management apparatus 20 in this embodiment, amounts to an executable state is the same as the operation example of the computing machinery system until the power-distribution-system management program amounts to the executable state.

Figure 5:
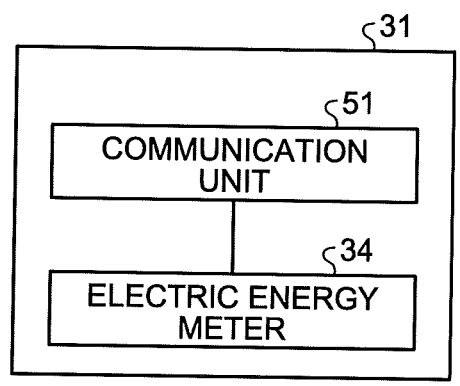
FIG. 5 is a diagram illustrating a configuration example of a smart meter in the first embodiment.
Figure 6:
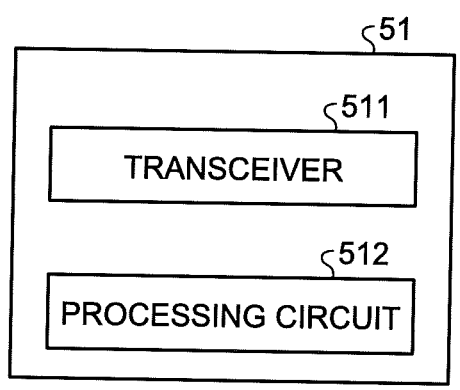
FIG. 6 is a diagram illustrating a configuration example of a communication unit in the first embodiment.

FIG. 5 is a diagram illustrating a configuration example of the smart meter 31 in this embodiment. The smart meter 31 includes the communication unit 51 that performs communication processing for connection to the communication network 21 and an electric energy meter 34 that measures an amount of electric power. FIG. 6 is a diagram illustrating a configuration example of the communication unit 51. The communication unit 51 includes a transceiver 511 that performs communication processing and a processing circuit 512 that controls the operation of the communication unit 51 and transmits measurement data of the electric energy meter 34 to the meter-data management apparatus 20 via the transceiver 511 once every constant period of time. The processing circuit 512 is, for example, a control circuit having a CPU and a memory. The communication unit 51 can be used as the communication unit 51 of the measurement apparatus 53 explained above.

The smart meters 32 and 33 each have the same configuration as the smart meter 31. However, the electric energy meter 34 of the smart meter 32 measures an amount of electric power in an uplink direction, that is, a direction from a consumer to an electric utility. The electric energy meter 34 of the smart meter 33 measures an amount of electric power obtained by subtracting an electric power amount in a downlink direction from an electric power amount in the uplink direction supplied from a power distribution line.

Operation in this embodiment is explained. The power-distribution-system management apparatus 1 in this embodiment estimates a power generation amount for each of solar power generation facilities using a measurement value of the all-quantity buyback smart meter set for automatic meter reading and a measurement value obtained by the measurement apparatus 53. The power-distribution-system management apparatus 1 calculates a total power generation amount for each of power distribution lines on the basis of the power generation amount of each of the solar power generation facilities and calculates a total load amount for each of the power distribution lines. Note that, in the following explanation, an example is explained in which only power generation amounts by the solar power generation facilities are taken into account as the total power generation amount. However, when power generation facilities other than the solar power generation facilities are connected to the power distribution lines, power generation amounts of these power generation facilities can be added to the total power generation amount. In this case, it is assumed that the power generation amounts obtained by the power generation facilities other than the solar power generation facilities are known.

An example is explained in which the power generation amount of each of the solar power generation facilities is estimated using the measurement value of the all-quantity buyback smart meter and the measurement value by the measurement apparatus 53. However, the power generation amount of each of the solar power generation facilities may also be estimated on the basis of any one of the measurement value of the all-quantity buyback smart meter and the measurement value by the measurement apparatus 53.

The all-quantity buyback smart meter is set for automatic meter reading. When the measurement value of the all-quantity buyback smart meter is used, it is possible to obtain a power generation amount of a solar power generation facility corresponding to the all-quantity buyback smart meter without adding any equipment such as a pyranometer. On the other hand, concerning a solar power generation facility not corresponding to the all-quantity buyback smart meter, a power generation amount cannot be grasped from a measurement value of the smart meter. A power generation amount of a solar power generation facility depends on an amount of insolation and the amount of insolation changes according to weather conditions. Therefore, it is conceivable to estimate the power generation amount of the solar power generation facility not corresponding to the all-quantity buyback smart meter using a measurement value of an all-quantity buyback smart meter present in a geometrically close position. However, there is a solar power generation facility near which no all-quantity buyback smart meter exists. For this reason, in this embodiment, the measurement apparatuses 53, which measure amounts of insolation, are disposed geographically equal as much as possible, and measurement values by the measurement apparatuses 53 are collected through the communication network 21 constituting a smart meter network. Note that the smart meter network is a network used for collecting measurement values of smart meters that measure electric energy, and includes the communication network 21 and the meter-data management apparatus 20. Concerning the solar power generation facility near which no all-quantity buyback smart meter exists, a power generation amount is estimated using the measurement values by the measurement apparatuses 53. Consequently, it is unnecessary to provide a new network for a pyranometer, and so it is possible to calculate a total power generation amount of the power distribution lines while preventing cost increase.

SM numbers, which are numbers for identifying the smart meters, are allocated to the smart meters. In this embodiment, like the smart meters, SM numbers are allocated to the measurement apparatuses 53. In this way, the SM numbers are allocated to the smart meters and the measurement apparatuses 53. However, numbers may be allocated to the smart meters and the measurement apparatuses 53 in their respective different numbering systems.

FIG. 7 is a diagram illustrating a configuration example of measurement data transmitted by the smart meters 31-1, 31-2, 32, and 33. The measurement data transmitted by the smart meters 31-1 31-2, 32, and 33 include, as illustrated in FIG. 7, an SM number, which is a number for identifying a smart meter, and a used amount of electric power and a power generation amount, which are measurement results. The used amount of electric power and the power generation amount are generally integrated values, which are updated every thirty minutes. That is, the used amount of electric power is a value to which an amount of electric power used in nearest thirty minutes is sequentially added. The power generation amount is a value to which a power generation amount generated in nearest thirty minutes is sequentially added.

Note that, concerning a smart meter connected to only a load or a solar power generation facility, it is unnecessary to include a power generation amount or a used amount of electric power in the measurement data, but to unify a format, this example is based on an assumption that all the smart meters transmit the measurement data illustrated in FIG. 7. A format of the measurement data is not limited to that shown in FIG. 7. Formats may be used according to measurement targets of the smart meters. Information other than the information illustrated in FIG. 7 may be included in the measurement data.

FIG. 8 is a diagram illustrating a configuration example of measurement data transmitted by the measurement apparatus 53. The measurement data transmitted by the measurement apparatus 53 includes, as illustrated in FIG. 8, an SM number and an amount of insolation that is a measurement result. The measurement apparatus 53 transmits a measurement value of the pyranometer 52 directly or after performing smoothing processing of the measurement value to the meter-data management apparatus 20 via the communication network 21 in every constant period of time, for example, every ten minutes as the measurement data illustrated in FIG. 8. As the smoothing processing carried out by the measurement apparatus 53, processing using a primary delay filter, for example, processing using a moving average or a section average of measurement values for a constant period such as thirty minutes can be used. The smoothing processing is carried out by the processing circuit 512 of the communication unit 51 of the measurement apparatus 53. As the communication unit 51 of the measurement apparatus 53, as explained above, a communication unit common to the communication unit 51 of the smart meter is used. When the smoothing processing is performed, a function of performing the smoothing processing is added to the processing circuit 512. However, for this addition of the function, addition of simple software or a simple dedicated circuit suffices. Alternatively, another circuit that performs the smoothing processing may be provided separately from the processing circuit 512.

FIG. 9 is a flowchart illustrating an example of a processing procedure of a measurement value of the smart meter in the meter-data management apparatus 20. The meter-data management apparatus 20 receives measurement values from the smart meter and the measurement apparatus 53 (step S1). Specifically, the communication unit 25 receives the measurement values of the smart meter and the measurement apparatus 53 via the communication network 21. The communication unit 25 determines on the basis of SM number data stored in the storing unit 24 whether received data is transmitted from the smart meter or transmitted from the measurement apparatus 53. FIG. 10 is a chart illustrating an example of the SM number data. As illustrated in FIG. 10, the SM number data is composed of an SM number and a type. The type is information indicating the smart meter or the measurement apparatus 53. In FIG. 10, the measurement apparatus 53 is described as pyranometer. The SM number data is stored in the storing unit 24 in advance. The communication unit 25 stores measurement data received from the smart meter in the storing unit 24 as SM measurement data and stores measurement data received from the measurement apparatus 53 in the storing unit 24 as amount-of-insolation measurement data.

The meter-data management apparatus 20 accumulates received measurement data for twenty-four hours (step S2). Specifically, the meter-data management apparatus 20 accumulates the received measurement data for twenty-four hours in the storing unit 24 as SM measurement data and amount-of-insolation measurement data. Thereafter, the data managing unit 23 of the meter-data management apparatus 20 extracts a measurement value of the all-quantity buyback smart meter from the SM measurement data accumulated for twenty-four hours (step S3).

Figures 11, 12:
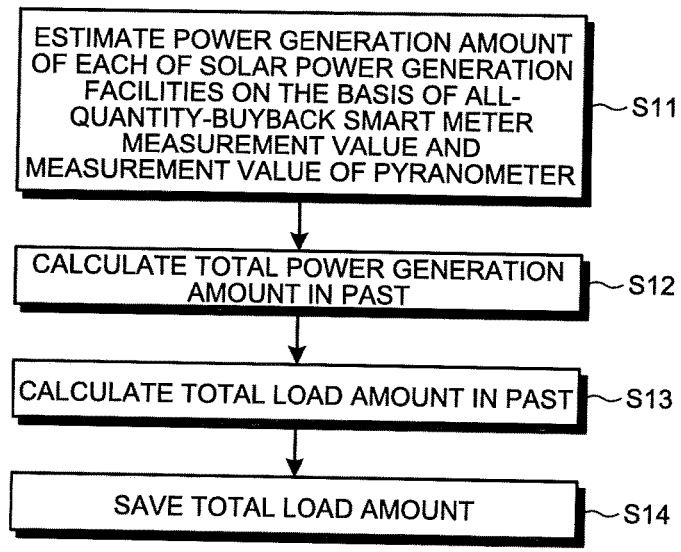
FIG. 11 is a chart illustrating an example of contract data retained in a storing section of the meter-data management apparatus in the first embodiment.
FIG. 12 is a flowchart illustrating an example of a load-data-calculation processing procedure in the power-distribution-system management apparatus in the first embodiment.

The meter-data management apparatus 20 retains, in the storing unit 24, correspondence between an SM number and contract information of a consumer corresponding to the SM number as contract data. The contract information includes a photovoltaics (PV) contract type, which is information indicating a contract type concerning a solar power generation amount. The PV contract type is information indicating whether the contract is an all-quantity buyback contract or a surplus buyback contract, or indicating whether the consumer does not have a contract concerning solar power generation, that is, does not have a solar power generation facility. FIG. 11 is a chart illustrating an example of the contract data retained in the storing unit 24. The contract data includes an SM number, a customer number of a consumer corresponding to the SM number, a PV contract type corresponding to the customer number, and an SM type, which is information indicating whether measurement of the smart meter is in the uplink direction or the downlink direction. In this example, the measurement apparatus 53 is treated the same as the smart meter and the SM number is allocated to the measurement apparatus 53. Therefore, the measurement apparatus 53 is also treated as an SM in a broad sense. Therefore, the data managing unit 23 extracts a measurement value of the all-quantity buyback smart meter from measurement data using the contract data (step S3). The data managing unit 23 transmits a measurement value of the all-quantity buyback smart meter and amount-of-insolation data, which is a measurement value of the pyranometer, for one day to the power-distribution-system management apparatus 1 via the communication unit 25 (step S4).

In the power-distribution-system management apparatus 1, the communication unit 16 stores the measurement value of the all-quantity buyback smart meter received from the meter-data management apparatus 20 in the storing unit 17 as the SM measurement data and stores the measurement value of the pyranometer received from the meter-data management apparatus 20 in the storing unit 17 as the amount-of-insolation measurement data. Note that the power-distribution-system management apparatus 1 receives the SM measurement data and the amount-of-insolation measurement data from the meter-data management apparatus 20 through a communication line, but the power-distribution-system management apparatus 1 may be configured to acquire the SM measurement data and the amount-of-insolation measurement data via a medium other than the communication line. That is, the communication unit 16 is one form of an acquiring unit that acquires the SM measurement data and the amount-of-insolation measurement data, and the acquiring unit may be, for example, an input unit that reads the medium.

FIG. 12 is a flowchart illustrating an example of a load-data-calculation processing procedure in the power-distribution-system management apparatus 1. In the power-distribution-system management apparatus 1, the powergeneration-amount estimating unit 11 estimates a power generation amount of each of the solar power generation facilities using measurement values of the all-quantity buyback smart meter and measurement values of the pyranometer for twenty-four hours, which are stored as SM measurement data (step S11).

Specifically, first, the power-generation-amount estimating unit 11 refers to the contract data and classifies the solar power generation facilities into a solar power generation facility connected to the all-quantity buyback smart meter and the other facilities. Concerning the solar power generation facility connected to the all-quantity buyback smart meter, the power-generation-amount estimating unit 11 directly uses a measurement value of the all-quantity buyback smart meter as an estimated value of a power generation amount of the solar power generation facility. On the other hand, as to the solar power generation facility not connected to the all-quantity buyback smart meter, the power-generation-amount estimating unit 11 cannot directly obtain a power generation amount from a measurement value of the smart meter. The power-generation-amount estimating unit 11 estimates a power generation amount of the solar power generation facility not connected to the all-quantity buyback smart meter using at least one of measurement values of all-quantity buyback smart meters connected to the other solar power generation facilities and the measurement apparatus 53.

When the power generation amount of the solar power generation facility not connected to the all-quantity buyback smart meter is estimated from the all-quantity buyback smart meters connected to the other solar power generation facilities, it is possible to suppress cost because new equipment is unnecessary. On the other hand, because the number of solar power generation facilities not connected to the all-quantity buyback smart meters is limited, when there is no solar power generation facility not connected to the all-quantity buyback smart meter in a nearby area, an estimation error in the estimation of the power generation amount of the solar power generation facility not connected to the all-quantity buyback smart meter increases. This is because a power generation amount by a solar power generation facility depends on an amount of insolation and it is more likely that the amount of insolation is different when a geographical position is away.

Therefore, in this embodiment, the pyranometers 52 of the measurement apparatuses 53 are disposed to be geometrically dispersed to make it possible to use measurement values of the measurement apparatuses 53 to thereby improve estimation accuracy of the power generation amount of the solar power generation facility not connected to the all-quantity buyback smart meter. The power-distribution-system management apparatus 1 collects the measurement values by the measurement apparatuses 53 via the communication network 21, which is a smart meter network, and the meter-data management apparatus 20. By so doing, it is unnecessary to provide a communication network for collecting measurement values of the pyranometers. Consequently, it is possible to minimize cost and improve estimation accuracy of a power generation amount. The pyranometers 52 of the measurement apparatuses 53 are set such that, for example, one pyranometer 52 is disposed in 1-kilometer square. In a place near which the all-quantity buyback smart meter is present, the pyranometer 52 of the measurement apparatus 53 does not have to be disposed.

In the power-distribution-system management apparatus 1 in this embodiment, solar power generation facility data and pyranometer position data are stored in the storing unit 17. FIG. 13 is a chart illustrating a configuration example of the solar power generation facility data. As illustrated in FIG. 13, the solar power generation facility data in this embodiment includes an SM number, which is an SM number of the smart meter to which the solar power generation facility is connected, latitude and longitude indicating a setting position of the solar power generation facility, and a PV panel capacity, which is a capacity of a solar panel (a photovoltaics (PV) panel) of the solar power generation facility.

FIG. 14 is a chart illustrating a configuration example of the pyranometer position data. As illustrated in FIG. 14, the pyranometer position data includes an SM number, which is an SM number of the measurement apparatus 53, a setting position of the pyranometer 52 of the measurement apparatus 53, that is, latitude and longitude indicating the setting position of the measurement apparatus 53. Note that, in the following explanation, a position of each of the pyranometers 52 of the measurement apparatuses 53 are referred to as a position of the measurement apparatus 53. The solar power generation facility not connected to the all-quantity buyback smart meter and the measurement apparatus 53 are referred to as measurement points as well.

Figure 15:
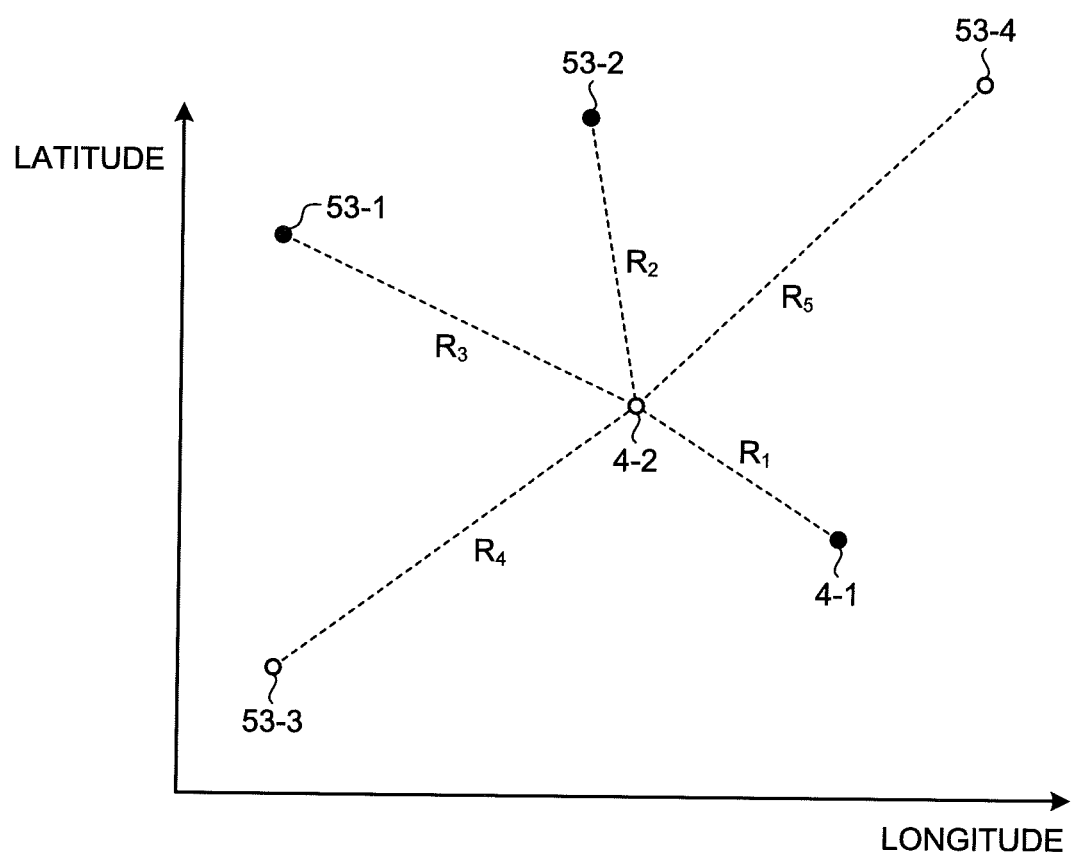
FIG. 15 is a graph illustrating an example of an estimation method for a power generation amount of a solar power generation facility not connected to an all-quantity buyback smart meter in the first embodiment.

The power-generation-amount estimating unit 11 estimates, for example, a power generation amount of the solar power generation facility not connected to the all-quantity buyback smart meter on the basis of measurement values of power generation amounts of the solar power generation facilities connected to three all-quantity buyback smart meters at shortest distances from the former solar power generation facility or measurement values of the pyranometers. FIG. 15 is a graph illustrating an example of an estimating method for a power generation amount of the solar power generation facility not connected to the all-quantity buyback smart meter in this embodiment. In FIG. 15, an example is illustrated in which a power generation amount of the solar power generation facility 4-2 is estimated. In the example illustrated in FIG. 15, the solar power generation facility 4-1 connected to the all-quantity buyback smart meter and measurement apparatuses 53-1 to 53-4 are present around the solar power generation facility 4-2.

The power-generation-amount estimating unit 11 refers to the solar power generation facility data and extracts latitude and longitude corresponding to an SM number of a smart meter connected to the solar power generation facility 4-2, that is, latitude and longitude of the solar power generation facility 4-2 and a PV panel capacity. Subsequently, the power-generation-amount estimating unit 11 refers to the solar power generation facility data and the pyranometer position data and calculates distances between the latitude and longitude of the solar power generation facility 4-2 and each of the positions of the solar power generation facilities connected to the all-quantity buyback smart meters and the measurement apparatuses 53. Note that the distance does not have to be an actual distance and can be a distance in a latitude and longitude coordinate system in a plane of latitude and longitude. This is because relative distances between the solar power generation facility 4-2 and the positions of the solar power generation facilities connected to the all-quantity buyback smart meters and the measurement apparatuses 53 only have to be known.

In the example illustrated in FIG. 15, the distance between the solar power generation facility 4-2 and the solar power generation facility 4-1 is represented as $R_1$, the distance between the solar power generation facility 4-2 and the measurement apparatus 53-1 is represented as $R_3$, the distance between the solar power generation facility 4-2 and the measurement apparatus 53-2 is represented as $R_2$, the distance between the solar power generation facility 4-2 and the measurement apparatus 53-3 is represented as $R_4$, and the distance between the solar power generation facility 4-2 and the measurement apparatus 53-4 is represented as $R_5$. In the example illustrated in FIG. 15, they are assumed to be $R_1<R_2<R_3<R_4<R_5$. In this case, the power-generation-amount estimating unit 11 selects three, that is, the solar power generation facility 4-1, the measurement apparatus 53-2, and the measurement apparatus 53-1 having shortest distances from the solar power generation facility 4-2 and estimates a power generation amount of the solar power generation facility 4-2 on the basis of measurement values corresponding to the selected three.

Specifically, the power-generation-amount estimating unit 11 extracts a measurement value $M_{4-1}$ of a power generation amount of an SM number corresponding to the solar power generation facility 4-1 from the SM measurement data and extracts PV panel capacities $P_{4-1}$ and $P_{4-2}$ of SM numbers corresponding to the solar power generation facility 4-1 and the solar power generation facility 4-2 from the solar power generation facility data. The power-generation-amount estimating unit 11 extracts measurement values $L_{53-2}$ and $L_{53-1}$ corresponding to SM numbers of the measurement apparatus 53-2 and the measurement apparatus 53-1 from the amount-of-insolation measurement data. The power-generation-amount estimating unit 11 calculates an estimated value $E_{4-2}$ of a power generation amount of the solar power generation facility 4-2 according to the following Expression (1). α is a coefficient for converting an amount of insolation into a ratio of a power generation amount to a panel capacity of a solar power generation facility (hereinafter referred to as power generation efficiency as well) and is a value determined in advance. α may be changed according to a season. Note that α is fixed irrespective of a pyranometer. However, α may be set for each of pyranometers. Note that a measurement value of the pyranometer is assumed to be an amount of insolation per unit area.

$$E_{4-2}=(M_{4-1} \lambda P_{4-2}/P_{4-1}+\alpha \times P_{4-2} \times (L_{53-2}+L_{53-1}))/3 \qquad (1)$$

When generalized, processing explained below is performed. When a solar power generation facility not connected to the all-quantity buyback smart meter is included in the selected three measurement points, the power-generation-amount estimating unit 11 calculates a power generation efficiency from a measurement value of a power generation amount of the solar power generation facility. The power-generation-amount estimating unit 11 multiplies the calculated power generation efficiency by a PV panel capacity of the estimation target solar power generation facility to thereby calculate an individual estimated value. When the measurement apparatus 53 is included in the selected three measurement points, the power-generation-amount estimating unit 11 multiplies together the coefficient for converting an amount of insolation into a power generation efficiency, the PV panel capacity of the estimation target solar power generation facility, and a measurement value of the measurement apparatus 53 to thereby calculate an individual estimated value. The power-generation-amount estimating unit 11 calculates an average of individual estimated values of the three measurement points as an estimated value of a power generation amount. The power-generation-amount estimating unit 11 calculates estimated values of power generation amounts as explained above for all solar power generation facilities not connected to the all-quantity buyback smart meters.

Note that the amounts of the solar power generation facilities not connected to the all-quantity buyback smart meters are estimated on the basis of the measurement values of the three measurement points having the shortest distances. However, the number of measurement points used for the estimation is not limited to three. However, it is desirable to use measurement values of a plurality of measurement points in order to reduce the influence of individual differences due to a setting environment.

Referring back to FIG. 12, after step S11, the total-power-generation-amount calculating unit 12 calculates a total power generation amount in the past (step S12). Specifically, the total-power-generation-amount calculating unit 12 calculates, concerning all solar power generation facilities connected to a power distribution line, a sum of power generation amounts for each of the solar power generation facilities estimated at step S11. Note that, in the following explanation, an example is explained in which a total load amount of loads connected to the power distribution line 9-1 is calculated. A total load amount can be calculated for the power distribution line 9-2 in the same manner. In addition, in this example, as the total power generation amount, the power generation amounts by the solar power generation facilities are calculated, but as explained above, power generation amounts by power generation facilities other than the solar power generation facilities may be added to calculate the total power generation amount.

Subsequently, the total-load calculating unit 13 calculates a total load amount in the past (step S13). Specifically, first, the total-load calculating unit 13 extracts, from sensor measurement data of the storing unit 17, a measurement value $P_F$ of a tidal current by the high voltage sensor 5-1 in a time period corresponding to a total power generation amount $P_G$ calculated by the total-power-generation-amount calculating unit 12. The total-load calculating unit 13 calculates a total load amount $P_L$ according to the following Expression (2) on the basis of the total power generation amount $P_G$ and the extracted $P_F$.

$$P_L=P_F-\text{total power generation amount } P_G \qquad (2)$$

Figure 16:
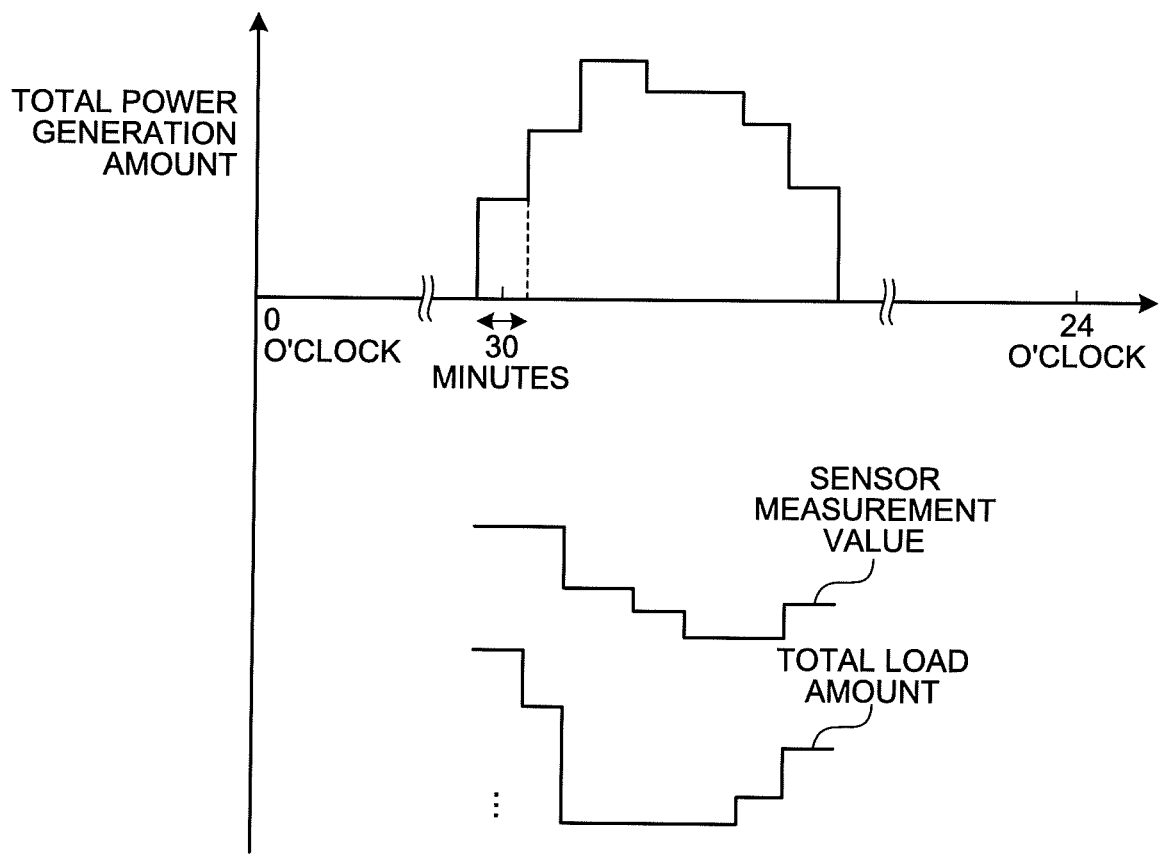
FIG. 16 is a graph illustrating a concept of a total load amount for twenty-four hours in the first embodiment.

The total-load calculating unit 13 stores total load amounts each calculated every thirty minutes, for twenty-four hours, in the storing unit 17 as load data (step S14). FIG. 16 is a graph illustrating a concept of the total load amounts for twenty-four hours. An upper part of FIG. 16 illustrates a total PV power generation amount in every thirty minutes, a middle part thereof illustrates a measurement value of a tidal current of a high voltage sensor in every thirty minutes, and a lower part thereof illustrates a total load amount in every thirty minutes. The total-load calculating unit 13 stores the total load amounts in every thirty minute for twenty-four hours illustrated in the lower part in the storing unit 17 as load data.

The power-distribution-system management apparatus 1 carries out the processing explained above every time the power-distribution-system management apparatus 1 receives measurement values of the all-quantity buyback smart meter and the measurement apparatus 53 for twenty-four hours. Consequently, a total load amounts in the past are accumulated in the storing unit 17 as load data.

Figure 17:
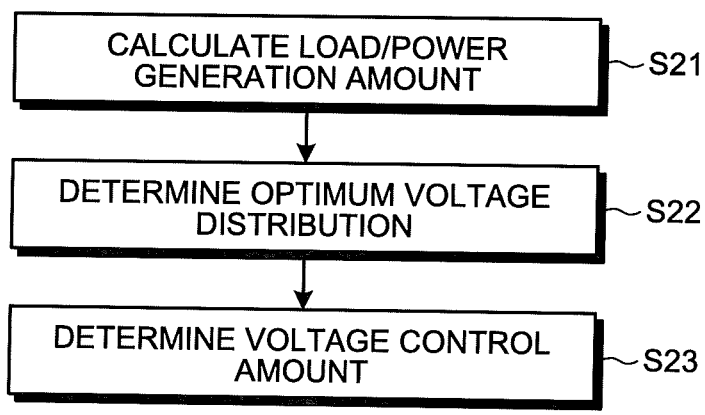
FIG. 17 is a flowchart illustrating an example of a voltage control procedure in the first embodiment.
Figure 18:
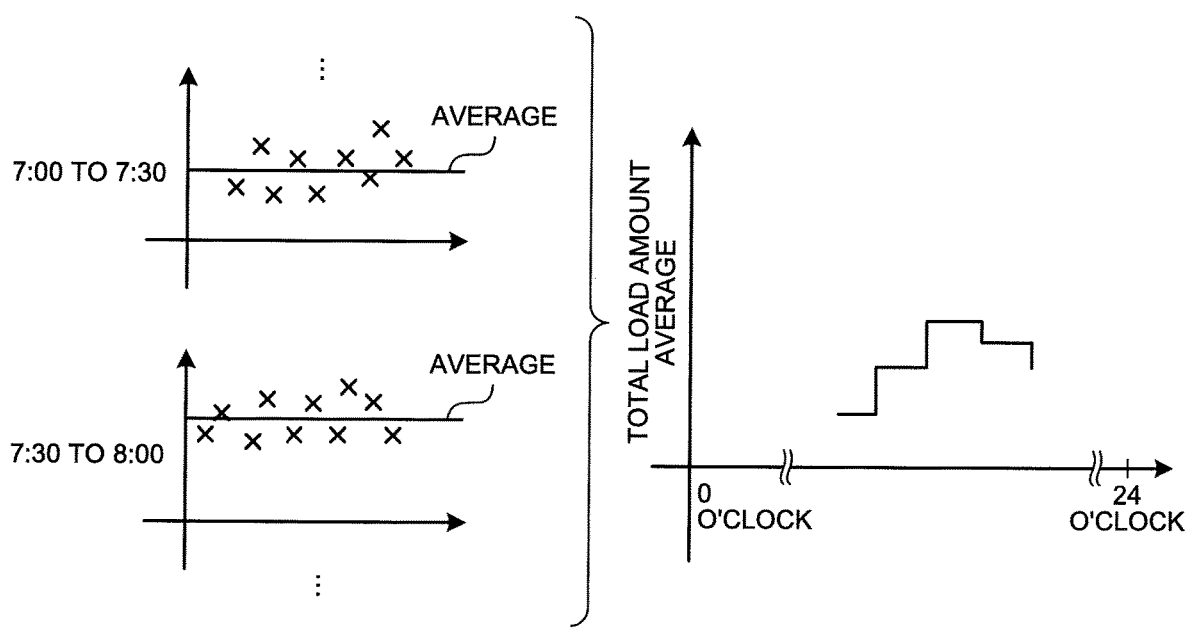
FIG. 18 is a chart illustrating a concept of a calculation method for a total load amount of the day in the first embodiment.

Estimation of load/power generation amounts of the day and voltage control in this embodiment are explained. The load/power-generation-amount calculating unit 14 calculates present load/power generation amounts on the basis of the accumulated load data and latest sensor measurement data. The voltage control unit 15 carries out voltage control of the power distribution system. FIG. 17 is a chart illustrating an example of a voltage control procedure in this embodiment. The load/power-generation-amount calculating unit 14 calculates load/power generation amounts of the day on the basis of the load data and the latest sensor measurement data (step S21). Specifically, first, the load/power-generation-amount calculating unit 14 extracts, from the load data, total load amounts in a nearest constant period among total load amounts in the same time period as the present, calculates an average of the extracted total load amounts, and sets the calculated average as a total load amount of the day. FIG. 18 is a chart illustrating a concept of a calculation method for the total load amount of the day. The left side of FIG. 18 illustrates total load amounts and averages for one month in time periods. The right side of FIG. 18 illustrates a calculated present total load amount.

The load/power-generation-amount calculating unit 14 may be configured to calculate an average in each of temperatures and each of time periods on the basis of total load amount for the past one year and set an average corresponding to a present temperature and a present time period as a present total load amount. Ranges of temperature are decided at an interval of 5 degrees in such a manner as . . . , 0° C. to 5° C., 5° C. to 10° C., . . . . An average of the total load amounts for the past one year is calculated for each of the ranges of temperature and each of the time periods.

Alternatively, the load/power-generation-amount calculating unit 14 may define weekdays and holidays as day-of-week divisions and use an average for each of the day-of-week divisions. The weekdays are Monday to Friday excluding national holidays and the holidays are Saturday, Sunday, and the national holidays. The load/power-generation-amount calculating unit 14 calculates, for each of the day-of-week divisions, an average of total load amounts for each of the time periods. Then, the load/power-generation-amount calculating unit 14 sets an average corresponding to a present day-of-week division as a present total load amount.

Alternatively, averages of total load amounts for one month in the time periods may be calculated for each of the day-of-week divisions, and the load/power-generation-amount calculating unit 14 may set an average corresponding to present day-of-week division and time period as a present total load amount. Alternatively, averages for each of the ranges of temperature and each of the time periods may be calculated for each of the day-of-week divisions, and the load/power-generation-amount calculating unit 14 may set an average corresponding to the present day-of-week division, temperature, and time period as the present total load amount.

Then, the load/power-generation-amount calculating unit 14 calculates a total power generation amount of the day on the basis of the total load amount of the day calculated at step S21 and a present measurement value of a tidal current of the high voltage sensor 5-1.

Subsequently, the voltage control unit 15 determines an optimum voltage distribution on the basis of calculated values of the load/power generation amounts by the load/power-generation-amount calculating unit 14 (step S22). Any method can be used as a method of calculating the optimum voltage distribution. For example, a tidal current calculation is executed to calculate an optimum solution of voltages at points of the power distribution line 9-1 such that the points of the power distribution line 9-1 have their conditions within a proper voltage range. The optimum solution is a solution for minimizing a predetermined evaluation function. The evaluation function may cover differences between the optimum voltage range and voltages at the points in the power distribution line 9-1, or the like.

The voltage control unit 15 determines a voltage control amount on the basis of the optimum voltage distribution (step S23). The voltage control unit 15 may be configured to control, as the voltage control amount, an optimum control amount that is a control amount for maintaining voltages calculated as the optimum voltage distribution, or to determine, as the voltage control amount, information indicating upper and lower limit values indicating a voltage control range determined on the basis of the optimum control amount. The optimum control amount is a control amount instructed to voltage control devices such that the optimum voltage distribution is realized. The voltage control unit 15 transmits the determined voltage control amount to the voltage control apparatus 80 via the communication unit 16. Note that, when a voltage control apparatus controlled by the power-distribution-system management apparatus 1 is present other than the voltage control apparatus 80, the voltage control unit 15 determines a control amount of the voltage control apparatus as well and transmits the determined voltage control amount to the voltage control apparatus via the communication unit 16. The voltage control unit 15 carries out the operation every constant period, for example, every one hour.

Note that, in the above explanation, the load/power-generation-amount calculating unit 14 calculates the load amount and the power generation amount of the day. However, separate configurations may be realized in which a load calculating unit that estimates the load amount of the day and a power-generation-amount calculating unit that calculates the power generation amount of the day are provided. The example is explained in which the load amount and the power generation amount of the day are calculated. However, in a case such as a case where a load amount and a power generation amount are used to draw up a power planning, the load/power-generation-amount calculating unit 14 may calculate load amounts and power generation amounts on or after the following day.

Compensation for deterioration of the pyranometer 52 is explained. In the pyranometer 52, in general, an error occurs in a measurement value because of aged deterioration. In particular, an error is large in an inexpensive pyranometer. An operator needs to operate the pyranometer 52 to calibrate the pyranometer 52, and an amount of work increases when there are a large number of pyranometers 52. Therefore, the power-distribution-system management apparatus 1 in this embodiment may be configured to correct measurement values of the pyranometers 52. Consequently, work for the calibration for the pyranometers 52 to be realized by the operator is unnecessary.

Figure 19:
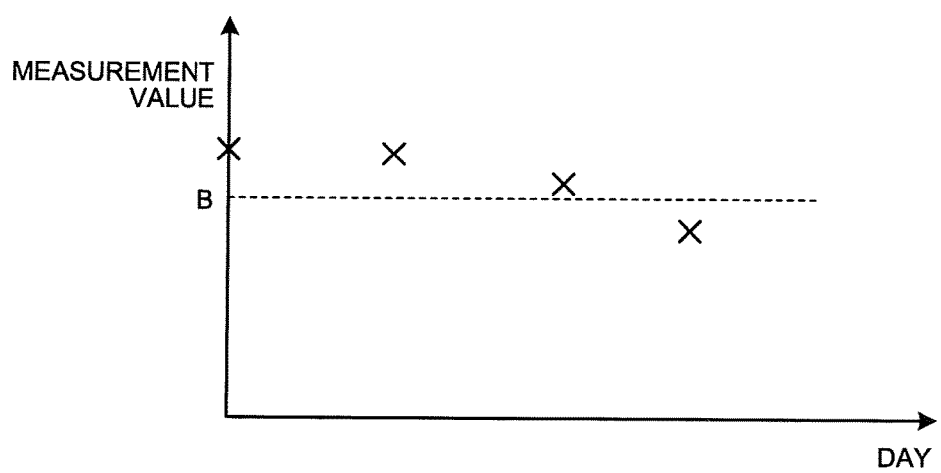
FIG. 19 is a graph illustrating an example of changes in a measurement value of a pyranometer in the first embodiment.

An example of correction processing of a measurement value of the pyranometer 52 in the power-distribution-system management apparatus 1 is explained. When the pyranometer 52 is deteriorated, a measurement value by the measurement apparatus 53, that is, the pyranometer 52, measured under the same condition, changes. FIG. 19 is a graph illustrating an example of the change in the measurement value of the pyranometer 52. FIG. 19 illustrates an example of the change in the measurement value of the pyranometer 52 under the same condition.

In this embodiment, the power-distribution-system management apparatus 1 acquires data for calibration of the pyranometer 52 under the same condition. The same condition means that an actual amount of insolation is invariant and means, for example, a measurement value obtained in the same season and the same time and in a fine day.

Alternatively, when an amount of insolation is known by other measurement means like an amount of insolation released by the Meteorological Agency or the like, use may be made of a method of extracting the same amount of insolation as the amount of insolation obtained by the other measurement means.

The power-generation-amount estimating unit 11 stores, for each of the pyranometers 52, the data for calibration, that is, the measurement value under the same condition as a part of the amount-of-insolation measurement data in the storing unit 17. For example, the operator sets, in the power-distribution-system management apparatus 1, information for identifying whether the data is data for calibration. The power-generation-amount estimating unit 11 of the power-distribution-system management apparatus 1 refers to the data for calibration at a timing such as once in one year or half a year and determines whether a measurement value of the pyranometer 52 changes or not. For example, the power-generation-amount estimating unit 11 determines whether or not the measurement value is equal to or smaller than a threshold B as illustrated in FIG. 19. The threshold is predetermined to be set as, for example, 90% of a data value for calibration in an operation initial period of the pyranometer 52. When the pyranometer 52 having a measurement value equal to or smaller than the threshold B is present, the power-generation-amount estimating unit 11 changes the coefficient α for converting an amount of insolation corresponding to the pyranometer 52 into a power generation efficiency to α'. When the threshold B is 90% of the data value for calibration in the operation initial period, α' can be set to α100/90.

As explained above, the power-generation-amount estimating unit 11 determines on the basis of the measurement value of the pyranometer 52 in the past under the same condition whether or not the pyranometer 52 is deteriorated. When determining that the pyranometer 52 is deteriorated, the power-generation-amount estimating unit 11 changes the coefficient α by which the measurement value corresponding to the pyranometer 52 is multiplied. Consequently, it is possible to omit work of the operator visiting a setting place of the pyranometer 52 and adjusting the pyranometer 52.

Further, a threshold of a second stage may be provided. The coefficient for converting an amount of insolation into a power generation efficiency may be changed stepwise, for example, to α", when the pyranometer 52 having an amount of insolation equal to or smaller than the threshold of the second stage is present. The threshold and an amount for changing the coefficient for converting an amount of insolation into a power generation efficiency may be varied for the pyranometers 52.

When a high-accuracy pyranometer with less deterioration is present among the pyranometers 52, the calibration may be performed on the basis of a measurement value of the high-accuracy pyranometer. Specifically, for example, a measurement value of the high-accuracy pyranometer in a fine day is represented as $L_{ref}$. A measurement value of an i-th pyranometer present within a range of, for example, approximately a 5-kilometer square around the high-accuracy pyranometer is represented as $L_{si}$. In this case, by multiplying a coefficient for converting an amount of insolation of the i-th pyranometer into a power generation efficiency by $L_{ref}/L_{si}$, the power-generation-amount estimating unit 11 calibrates the amount of insolation of the i-th pyranometer.

As explained above, the power-distribution-system management system in this embodiment includes the measurement apparatus 53 including the pyranometer 52 and transmits a measurement value by the measurement apparatus 53 via the communication network 21. Therefore, it is possible to collect the measurement values of the measurement apparatus 53 while saving cost. By estimating a power generation amount of the solar power generation facility using the measurement value of the measurement apparatus 53, it is possible to accurately estimate a power generation amount in the power distribution system.

Second Embodiment

Figure 20:
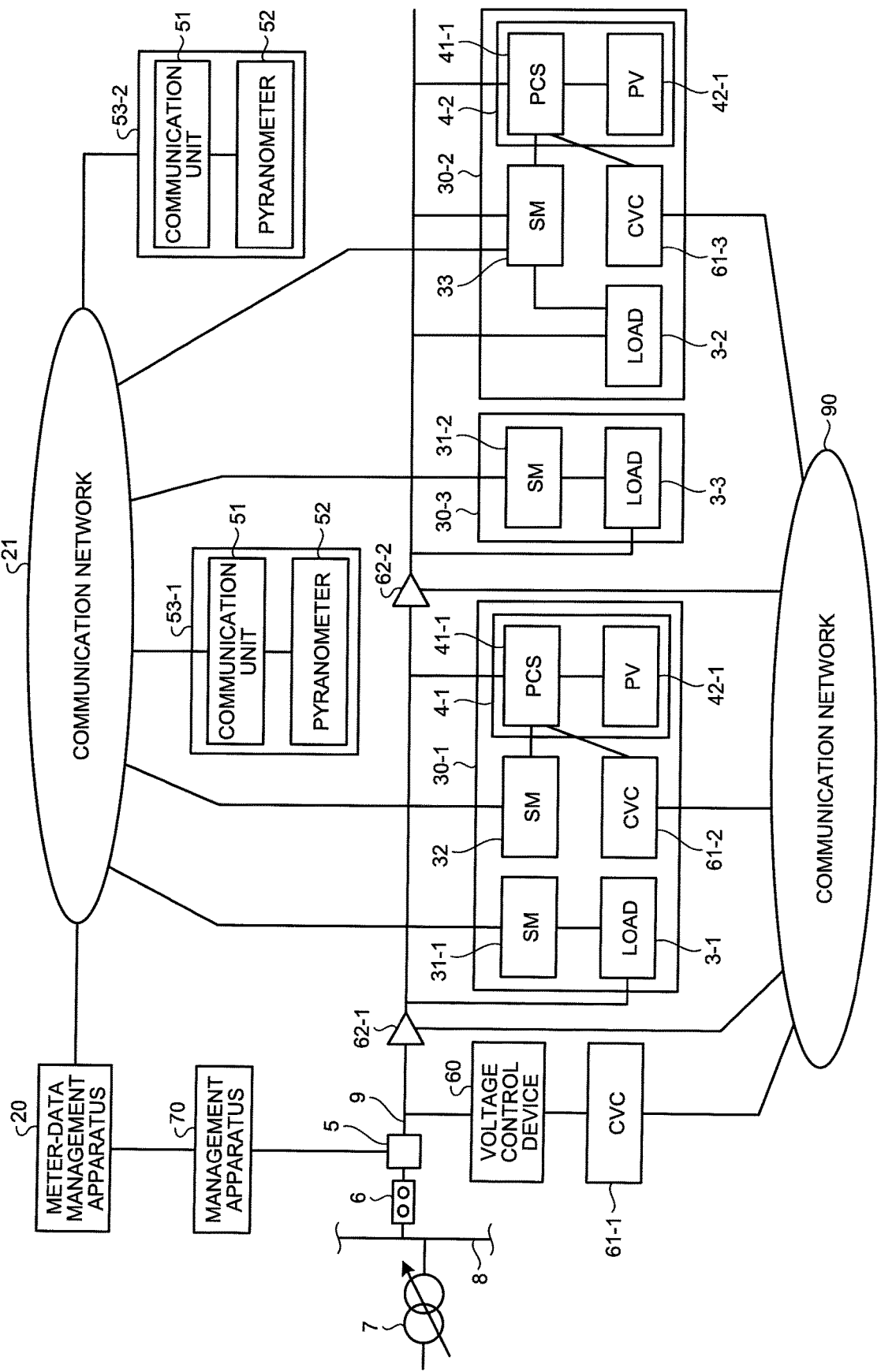
FIG. 20 is a diagram illustrating a configuration example of a power-distribution-system voltage control system according to a second embodiment.

FIG. 20 is a diagram illustrating a configuration example of a power-distribution-system voltage control system according to a second embodiment of the present invention. In FIG. 20, as in the first embodiment, the voltage control device 7 is an LRT functioning as a transformer for power distribution. The bus 8 is connected to a secondary side of the voltage control device 7. Two power distribution lines 9 are connected to the bus 8. Note that, in FIG. 20, to simplify the figure, an example is illustrated in which one power distribution line is connected. However, in general, the number of power distribution lines connected to the bus 8 is more than one. A high voltage sensor 5, which is a measurement apparatus that measures a voltage and a tidal current of feeding of the power distribution line 9, is set at an end point on an upstream side. Components having the same functions as the functions in the first embodiment are denoted by the same reference numerals and signs as those in the first embodiment, so as to omit redundant explanation.

Cooperative voltage sensors (CVSs) 62-1 and 62-2 are connected to the power distribution line 9. The cooperative voltage sensors 62-1 and 62-2 can measure voltages in setting places of the cooperative voltage sensors 62-1 and 62-2, that is, their own ends. The cooperative voltage sensors 62-1 and 62-2 are connected to a communication network 90 via a wireless line or a network cable.

A voltage control device 60 is connected to the power distribution line 9. A cooperative voltage controller (CVC) 61-1, which controls the voltage control device 60, is connected to the voltage control device 60. The cooperative voltage controller 61-1 is configured integrally with or juxtaposed with the voltage control device 60. The voltage control device 60 measures a voltage and an effective power in a setting place of the voltage control device 60, that is, its own end in the power distribution line 9. A cooperative voltage controller 61-1 is connected to the communication network 90 via a wireless line or a network cable.

In FIG. 20, for simplification of the figure, one voltage device 60 and one cooperative voltage controller 61-1 are illustrated. However, two or more voltage control devices 60 and two or more cooperative voltage controllers 61-1 may be connected to the power distribution line 9.

The same consumers 30-1, 30-2, and 30-3 as those in the first embodiment are connected to the power distribution line 9. That is, the loads 3-1 to 3-3 and the solar power generation facilities 4-1 and 4-2 are connected to the power distribution line 9. As in the first embodiment, the consumer 30-1 has, with an electric utility, an all-quantity buyback contract for selling an entire power generation amount by the solar power generation facility 4-1. The consumer 30-2 has a surplus buyback contract with the electric utility.

Each of the solar power generation facilities 4-1 and 4-2 has a power conditioner (PCS) 41-1 that is a voltage control device, and a solar battery (PV) 42-1 that carries out solar power generation. The cooperative voltage controller 61-2 is connected to the power conditioner 41-1 of the solar power generation facility 4-1. A cooperative voltage controller 61-3 is connected to the power conditioner 41-1 of the solar power generation facility 4-2. The cooperative voltage controllers 61-2 and 61-3 adjust control amounts of the power conditioners 41-1, specifically, adjust reactive powers outputted by the power conditioners 41-1 to thereby control the power conditioners 41-1. The cooperative voltage controllers 61-2 and 61-3 are connected to the communication network 90 via a wireless line or a network cable.

As in the first embodiment, the smart meters 31-1, 31-2, 32, and 33 are connected to the meter-data management apparatus 20 via the communication network 21. The smart meters 31-1, 31-2, 32, and 33 measure an amount of electric power in a constant measurement cycle and transmit the measured electric power amount to the meter-data management apparatus 20. As in the first embodiment, the measurement apparatuses 53-1 and 53-2 are connected to the communication network 21.

In the first embodiment, the power-generation-amount estimating method in the power distribution system controlled by the concentrated voltage control scheme is explained. However, the estimation method for a power generation amount explained in the first embodiment can be applied to a power-distribution-system voltage control system controlled by a distributed control scheme. In the distributed voltage control scheme, an apparatus that performs voltage control of the entire power distribution system is not provided, but each voltage control apparatus autonomously performs voltage control. There is no particular limitation on a specific voltage control method of the distributed voltage control scheme. However, in this embodiment, as an example of the distributed voltage control, an example is explained in which each voltage control apparatus autonomously performs control in cooperation with other voltage control apparatuses.

The cooperative voltage controllers 61-1 to 61-3 in this embodiment have control of voltage control devices to which the cooperative voltage controllers 61-1 to 61-3 are connected such that voltages of power distribution lines to which the voltage control devices are connected are in a proper voltage ranges determined in advance. When the voltages of the power distribution lines, to which the voltage controllers are connected, deviate from the proper voltage range for a certain period or more or when the voltages deviate, for a certain period or more, from a range obtained by narrowing the proper voltage range by an allowance, the cooperative voltage controllers 61-1 to 61-3 transmit an upper and lower limit values change request to at least one of another cooperative voltage controller or a cooperative voltage measurement apparatus, determined in advance, via the communication network 90. The upper and lower limit values change request includes a direction in which a voltage is changed and a change amount of a voltage. The other cooperative voltage controller determined in advance is, for example, the closest cooperative voltage controller on the upstream side.

The cooperative voltage controller having received the upper and lower limit values change request changes a control target range on the basis of the upper and lower limit values change request. An initial value of the control target range is the proper voltage range or the range obtained by narrowing the proper voltage range by the allowance. The cooperative voltage controller having received the upper and lower limit values change request transfers the upper and lower limit values change request to at least one of the other cooperative voltage controller or the cooperative voltage measurement apparatus determined in advance. Similarly, when the voltages of the power distribution lines, to which the voltage controllers are connected, deviate from the proper voltage range for the certain period or more or when the voltages deviate, for the certain period or more, from the range obtained by narrowing the proper voltage range by the allowance, the cooperative voltage measurement sensors 62-1 and 62-2 transmit an upper and lower limit values change request to at least one of the other cooperative voltage controller or the cooperative voltage measurement apparatus determined in advance via the communication network 90. The cooperative voltage controller having received the upper and lower limit values change request transfers the upper and lower limit values change request to at least one of the other cooperative voltage controller and the cooperative voltage measurement apparatus determined in advance.

In this embodiment, as explained above, the voltage in the power-distribution-system voltage control system is controlled to be maintained in the proper range. In such a power-distribution-system voltage control system, a total power generation amount of the power distribution line 9 is not used for voltage control. However, a total power generation amount or a total load amount is sometimes calculated for the purpose of drawing up a facility planning covering how to set the thickness of a power distribution line or for the purpose of drawing up a planning of power purchase in a smart community. In this embodiment, an example is explained in which a management apparatus 70, which is a power-distribution-system management apparatus, estimates a total power generation amount.

The management apparatus 70 has a configuration obtained by deleting the voltage control unit 15 from the configuration of the power-distribution-system management apparatus 1 illustrated in FIG. 2. The management apparatus 70 is connected to the high voltage sensor 5 via any communication network and acquires a measurement value of the high voltage sensor 5. When the management apparatus 70 is a management apparatus that manages the smart community, the management apparatus 70 may have a function of drawing up power planning such as a power purchase planning, a power sale planning, and a planning of charging and discharging of a storage battery in the smart community on the basis of a power generation amount and a load amount predicted by the load/power-generation-amount calculating unit 14. As hardware for realizing the management apparatus 70, a computer similar to the hardware for realizing the power-distribution-system management apparatus 1 in the first embodiment can be used.

As in the first embodiment, the management apparatus 70 acquires a measurement value of the all-quantity buyback smart meter and a measurement value of the measurement apparatus 53 from the meter-data management apparatus 20 and estimates a power generation amount of each of the solar power generation facilities on the basis of these measurement values. Then, the management apparatus 70 calculates a total load amount on the basis of a total power generation amount of the power distribution line, accumulates the total load amount as load data, and predicts a total power generation amount and a total load amount of the day using the load data. The management apparatus 70 draws up a planning of power purchase on the basis of the total power generation amount and the total load amount of the day. The management apparatus 70 may estimate a total power generation amount and a total load amount of the following day or two or more days after the day using the load data and draw up a planning of power purchase on the basis of the total power generation amount and the total load amount of the following day or the two or more days after the day.

Note that, when load data only has to be acquired for drawing up a facility planning, that is, when a power generation amount and a load amount of the day do not have to be predicted, the management apparatus 70 does not have to include the load/power-generation-amount calculating unit 14.

In this embodiment, as with the first embodiment, the management apparatus 70 may be configured to acquire data for calibration of the pyranometer 52 and compensate for deterioration of the pyranometer 52.

As explained above, in this embodiment, in the power-distribution-system voltage control system in the distributed voltage control scheme, the example is explained in which a power generation amount is estimated using a measurement value by the measurement apparatus 53 as in the first embodiment. In this way, also in the power-distribution-system voltage control system in the distributed voltage control scheme, it is possible to accurately estimate a power generation amount while saving costs.

Third Embodiment

Figure 21:
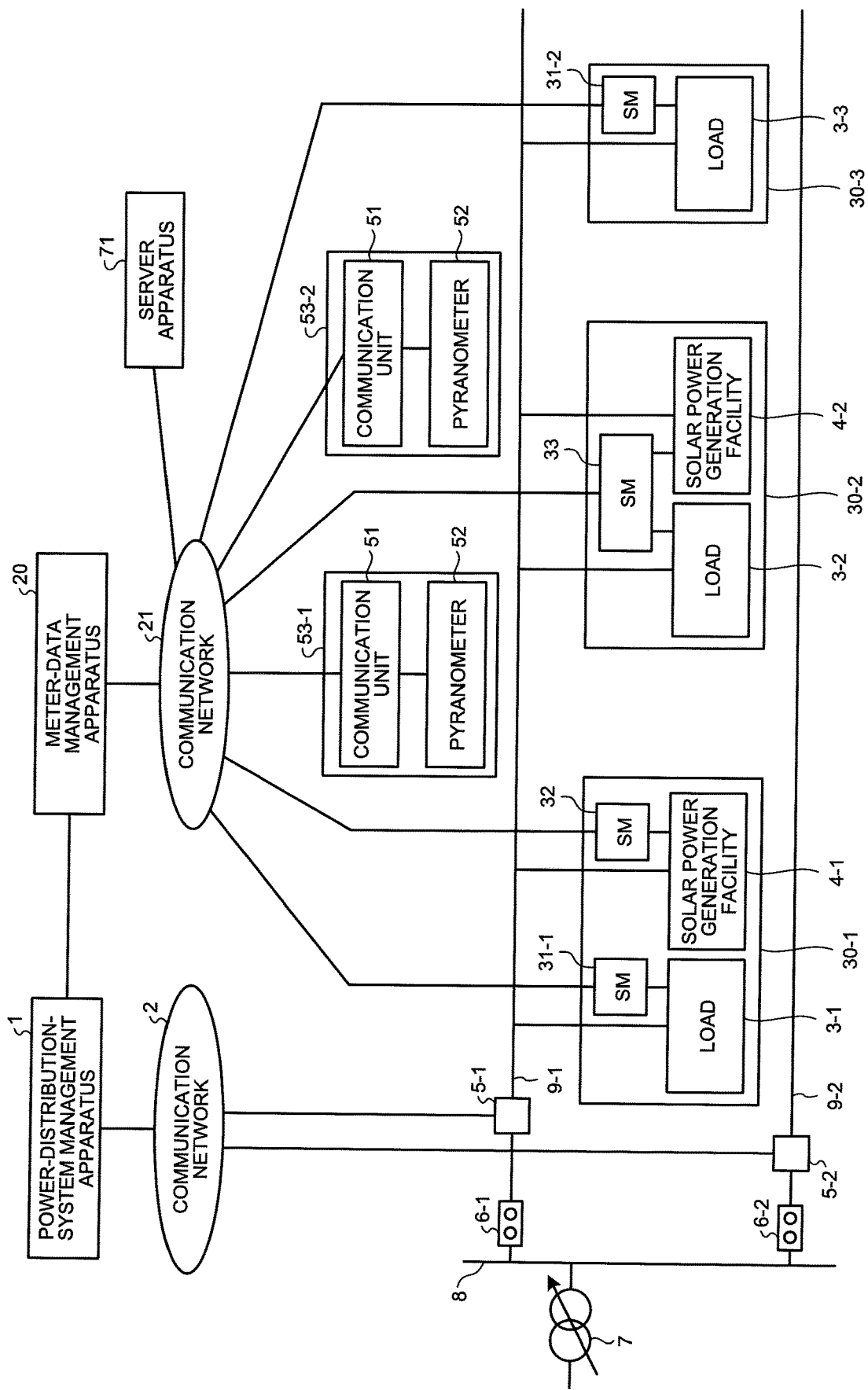
FIG. 21 is a diagram illustrating a configuration example of a power-distribution-system voltage control system according to a third embodiment.

FIG. 21 is a diagram illustrating a configuration example of a power-distribution-system voltage control system according to a third embodiment of the present invention. The power-distribution-system voltage control system in this embodiment is equal to the power-distribution-system voltage control system in the first embodiment except that a server apparatus 71 is added to the power-distribution-system voltage control system in the first embodiment. Components having the same functions as the functions in the first embodiment are denoted by the same reference numerals and signs, so as to omit redundant explanation.

As in the first embodiment, the power-distribution-system management apparatus 1 in this embodiment estimates a power generation amount of each of solar power generation facilities using measurement values of the measurement apparatus 53 and the all-quantity buyback smart meter. On the other hand, the measurement value of the measurement apparatus 53 is information beneficial not only for the purpose of power distribution control but also other purposes. For example, the measurement value of the measurement apparatus 53 can be used for a weather analysis for, for example, grasping a distribution of cloud. Therefore, this embodiment is directed to a configuration in which a measurement value of the measurement apparatus 53 can be provided to other systems. The said other systems are systems other than a system that performs voltage control or power management, for example, a system that performs a weather analysis, but are not limited to the system that performs the weather analysis.

As in the first embodiment, after collecting the measurement value of the measurement apparatus 53, the meter-data management apparatus 20 may provide the measurement value of the measurement apparatus 53 to the other systems. However, in this embodiment, as illustrated in FIG. 21, the server apparatus 71 receives the measurement value of the measurement apparatus 53 directly from the communication network 21 or via another network. Consequently, the server apparatus 71 can receive a measurement value more similar to a real-time measurement value.

The configurations explained above in the embodiments show examples of the contents of the present invention. The configurations can be combined with other publicly-known techniques, and partially omitted and/or modified without departing from the spirit of the present invention.

REFERENCE SIGNS LIST 1 power-distribution-system management apparatus; 2, 21, 90 communication network; 3-1 to 3-3 load; 4-1, 4-2 solar power generation facility; 5, 5-1, 5-high voltage sensor; 6-1, 6-2 breaker; 7 voltage control device; 8 bus; 9, 9-1, 9-2 power distribution line; 11 power-generation-amount estimating unit; 12 total-power-generation-amount calculating unit; 13 total-load calculating unit; 14 load/power-generation-amount calculating unit; 15 voltage control unit; 16, 25, 105 communication unit; 17, 24, 103 storing unit; 20 meter-data management apparatus; 22 SM managing unit; 23 data managing unit; 30-1 to 30-3 consumer; 31-1, 31-2, 32, 33 smart meter; 34 electric energy meter; 51 communication unit; 52 pyranometer; 53-1 to 53-4 measurement apparatus; 61-1 to 61-3 cooperative voltage controller; 62-1, 62-2 cooperative voltage measurement apparatus; 70 management apparatus; 71 server apparatus; 80 voltage control apparatus; 101 control unit; 102 input unit; 104 display unit; 106 output unit; 107 system bus.

The invention claimed is:

1. A power-distribution-system management apparatus comprising:
   an acquiring unit to acquire an amount of insolation, which is a measurement value measured by a pyranometer, via a smart meter network, which is a network used to collect a measurement value of a smart meter that measures an amount of electric power; and
   a power-generation-amount estimating unit to estimate, on the basis of the amount of insolation, a power generation amount of each of two or more solar power generation facilities and each connected to a power distribution line of a high voltage system,
   wherein the power-generation-amount estimating unit multiplies the amount of insolation by a coefficient for converting the amount of insolation into a power generation efficiency to thereby calculate the power generation efficiency, and estimates a power generation amount of the solar power generation facility, which is an estimation target of a power generation amount, on the basis of the power generation efficiency, and
   wherein, on the basis of an amount of change between a past measured value of insolation and a current measured value of insolation, wherein the past measured value of insolation was measured under a condition including an amount of actual insolation and the current measured value of insolation is measured under the same condition including the same amount of actual insolation, the power-generation-amount estimating unit determines whether the pyranometer, which has measured the insolation, has deteriorated, and when the power-generation-amount estimating unit determines that the pyranometer has deteriorated, the power-generation-amount estimating unit changes the coefficient by which the amount of insolation corresponding to the pyranometer is multiplied in accordance with the amount of change between the current measured value of insolation and the past measured value of insolation.

2. The power-distribution-system management apparatus according to claim 1, wherein
   the acquiring unit further acquires, via the smart meter network, a measurement value of an all-quantity buyback smart meter, which is a smart meter that measures a power generation amount of an all-quantity-buyback solar power generation facility that is a subject of an all-quantity buyback contract among the two or more solar power generation facilities connected to the power distribution line, and the power-generation-amount estimating unit estimates, on the basis of the amount of insolation and the measurement value of the all-quantity buyback smart meter, the power generation amount of each of the solar power generation facilities connected to the power distribution line.

3. The power-distribution-system management apparatus according to claim 2, wherein a setting position of the all-quantity-buyback solar power generation facility connected to the all-quantity buyback smart meter and a setting position of the pyranometer are set as measurement points, and the power-generation-amount estimating unit estimates the power generation amount of the solar power generation facilities on the basis of measurement values of a trio of the measurement points selected in ascending order of distances from the solar power generation facilities.

4. The power-distribution-system management apparatus according to claim 1 comprising:

a total-power-generation-amount calculating unit to estimate a total solar power generation amount, which is a sum of power generation amounts by the solar power generation facilities connected to the power distribution line; and a total-load calculating unit to estimate a total load amount connected to the power distribution line on the basis of the total solar power generation amount and a tidal current measured at an end point on an upstream side of the power distribution line.

5. The power-distribution-system management apparatus according to claim 4, further comprising a load calculating unit to calculate a total load amount of a day on the basis of the total load amount in past.

6. The power-distribution-system management apparatus according to claim 5, comprising a voltage control unit to determine, on the basis of the total load amount of the day, a control amount of a voltage control device connected to the power distribution line.

7. The power-distribution-system management apparatus according to claim 1, wherein the pyranometer is set in an electric pole.

8. The power-distribution-system management apparatus according to claim 1, wherein the pyranometer is set in a relay tower of a mobile communication system.

9. The power-distribution-system management apparatus according to claim 1, wherein the power-generation-amount estimating unit changes the coefficient when the current measured value of insolation is equal to or less than a predetermined threshold percentage of the past measured value of insolation.

10. A power-distribution-system management system comprising:

a power distribution line of a high voltage system;

a plurality of solar power generation facilities connected to the power distribution line;

a smart meter network, which is a network used to collect a measurement value of a smart meter that measures electric energy;

a pyranometer to measure an amount of insolation; and a power-distribution-system management apparatus, wherein the power-distribution-system management apparatus includes:

an acquiring unit to acquire the amount of insolation via the smart meter network; and a power-generation-amount estimating unit to estimate, on the basis of the amount of insolation, a power generation amount of each of the solar power generation facilities, and wherein the power-generation-amount estimating unit multiplies the amount of insolation by a coefficient for converting the amount of insolation into a power generation efficiency to thereby calculate the power generation efficiency, and estimates a power generation amount of the solar power generation facility, which is an estimation target of a power generation amount, on the basis of the power generation efficiency, and wherein, on the basis of an amount of change between a past measured value of insolation and a current measured value of insolation, wherein the past measured value of insolation was measured under a condition including an amount of actual insolation and the current measured value of insolation is measured under the same condition including the same amount of actual insolation, the power-generation-amount estimating unit determines whether the pyranometer, which has measured the insolation, has deteriorated, and when the power-generation-amount estimating unit determines that the pyranometer has deteriorated, the power-generation-amount estimating unit changes the coefficient by which the amount of insolation corresponding to the pyranometer is multiplied in accordance with the amount of change between the current measured value of insolation and the past measured value of insolation.

11. The power-distribution-system management system according to claim 10, wherein the power-generation-amount estimating unit changes the coefficient when the current measured value of insolation is equal to or less than a predetermined threshold percentage of the past measured value of insolation.

12. A power-generation-amount estimating method comprising:

a first step of acquiring an amount of insolation, which is a measurement value obtained by measurement of a pyranometer, via a smart meter network, which is a network used to collect a measurement value of a smart meter that measures an amount of electric power; and a second step of estimating, on the basis of the amount of insolation, a power generation amount of each of two or more solar power generation facilities connected to a power distribution line of a high voltage system, wherein the second step comprises:

multiplying the amount of insolation by a coefficient for converting the amount of insolation into a power generation efficiency to thereby calculate the power generation efficiency; and estimating a power generation amount of the solar power generation facility, which is an estimation target of a power generation amount, on the basis of the power generation efficiency, wherein, on the basis of an amount of change between a past measured value of insolation and a current measured value of insolation, wherein the past measured value of insolation was measured under a condition including an amount of actual insolation and the current measured value of insolation is measured under the same condition including the same amount of actual insolation, the second step determines whether the pyranometer, which has measured the insolation, has deteriorated, and when the second step determines that the pyranometer has deteriorated, the second step changes the coefficient by which the amount of insolation corresponding to the pyranometer is multiplied in accordance with the amount of change between the current measured value of insolation and the past measured value of insolation.

13. The power-generation-amount estimating method according to claim 12, wherein the coefficient is changed when the current measured value of insolation is equal to or less than a predetermined threshold percentage of the past measured value of insolation.

* * * * *